US012775939B1

(12) United States Patent
Buchner et al.

(10) Patent No.: US 12,775,939 B1
(45) Date of Patent: Oct. 27, 2026

(54) PERSONAL DATASTORE USAGE IN A DECENTRALIZED NETWORK

(71) Applicant: Block, Inc., San Francisco, CA (US)

(72) Inventors: Daniel Buchner, Austin, TX (US); Sahid Hernandez, Oslo (NO)

(73) Assignee: Block, Inc., Oakland, CA (US)

( * ) Notice: Subject to any disclaimer, the term of this patent is extended or adjusted under 35 U.S.C. 154(b) by 326 days.

(21) Appl. No.: 18/446,718

(22) Filed: Aug. 9, 2023

Related U.S. Application Data

(60) Provisional application No. 63/467,140, filed on May 17, 2023.

(51) Int. Cl.

| | |
|---|---|
| ***G06Q 20/38*** | (2012.01) |
| ***G06F 21/62*** | (2013.01) |
| ***G06Q 20/12*** | (2012.01) |
| ***G06Q 20/40*** | (2012.01) |
| ***H04L 9/32*** | (2006.01) |

(52) U.S. Cl.
CPC ... *G06Q 20/38215* (2013.01); *G06F 21/6209* (2013.01); *G06Q 20/123* (2013.01); *G06Q 20/401* (2013.01); *H04L 9/3218* (2013.01); *H04L 9/3247* (2013.01); *G06F 2221/2141* (2013.01)

(58) Field of Classification Search
CPC ...... G06Q 20/00-425; G06F 21/00-88; H04L 9/00-50
See application file for complete search history.

(56) References Cited

U.S. PATENT DOCUMENTS

| | | | | |
|---|---|---|---|---|
| 12,293,170 | B1 * | 5/2025 | Van Voorden | H04L 9/0861 |
| 12,335,395 | B2 * | 6/2025 | Jakobsson | H04L 9/3297 |
| 2015/0249720 | A1 * | 9/2015 | Delug | H04L 67/567 709/219 |
| 2020/0351271 | A1 * | 11/2020 | Murdoch | H04L 63/102 |
| 2022/0329653 | A1 * | 10/2022 | Govindarajan | H04L 67/51 |
| 2023/0306547 | A1 * | 9/2023 | Patel | G06Q 50/265 |

OTHER PUBLICATIONS

"Decentralized Identity and Verifiable Credentials", Microsoft Security, Sep. 28, 2022 (Year: 2022).*

* cited by examiner

*Primary Examiner* — Chenyuh Kuo
(74) *Attorney, Agent, or Firm* — IP Spring

(57) ABSTRACT

Personal datastore usage techniques in a decentralized network are described. In one or more examples, a decentralized identifier associated with an artist is obtained. The decentralized identifier is resolved to a decentralized node as part of a network of decentralized nodes. A request is generated to access digital content associated with the artist from a personal datastore maintained at the resolved decentralized node, the request includes verifiable credentials. The digital content is received from the personal datastore in response to a validation of the verifiable credentials. A user interface is configured based on the digital content and on customization data maintained in the computer-readable storage medium. The user interface is displayed in support of output of the digital content.

16 Claims, 18 Drawing Sheets

PERSONAL DATASTORE USAGE IN A DECENTRALIZED NETWORK

RELATED APPLICATIONS

This application claims priority under 35 U.S.C. § 119 (e) to U.S. Provisional Application No. 63,467,140, filed May 17, 2023, and titled "Personal Datastore Usage in a Decentralized Network," the entire disclosure of which is hereby incorporated by reference.

TECHNICAL FIELD

Decentralized networks provide a variety of functionality in connection with implementing and securely transferring various digital assets, examples of which include cryptocurrencies and cryptographic-based tokens, such as tokens for decentralized web applications, applications implemented as part of a distributed state machine, and so on. Additional functionalities have been developed that leverage decentralized networks, examples of which include use of decentralized identifiers (DIDs) and verifiable credentials.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
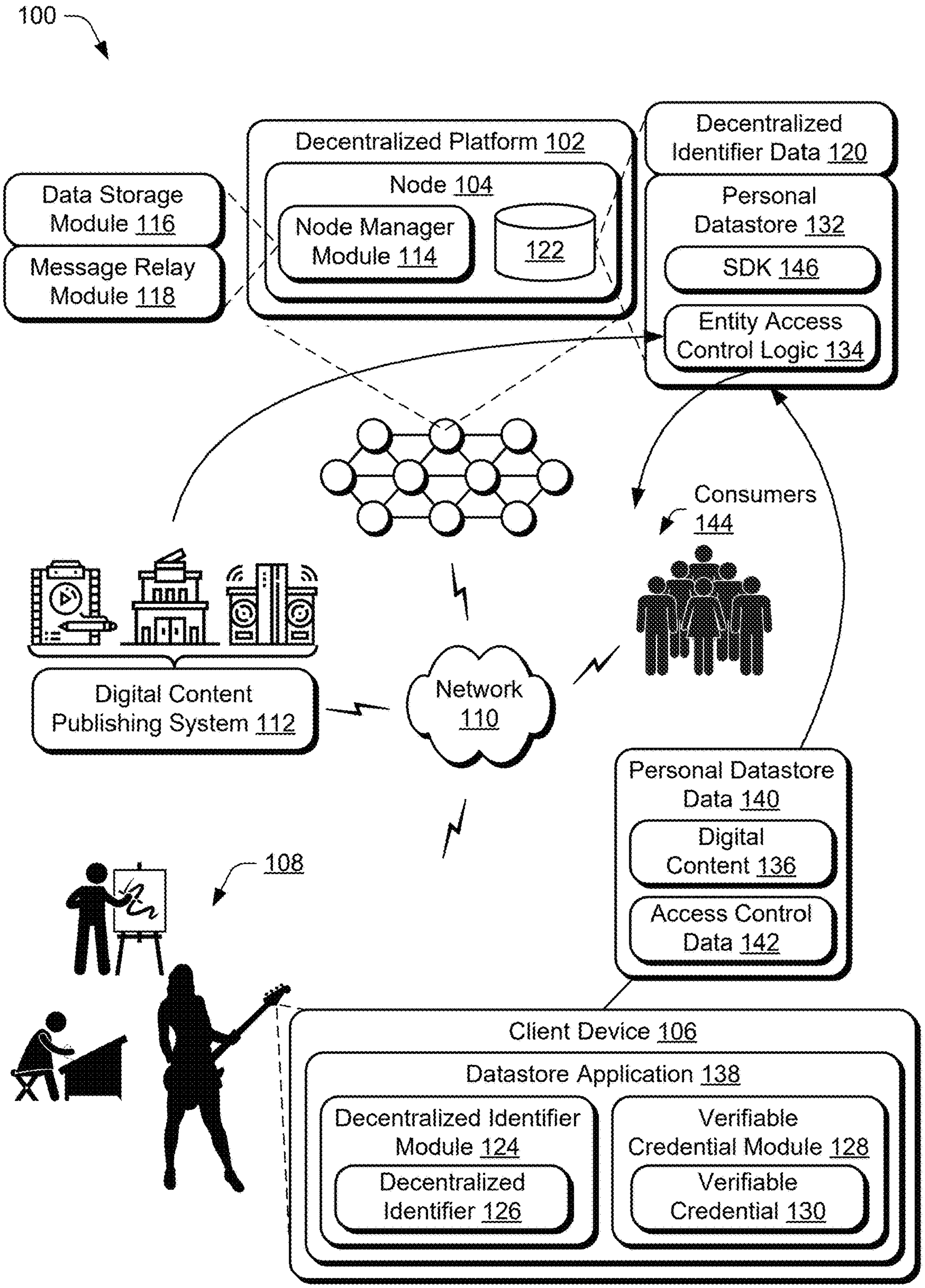
FIG. 1 is a non-limiting illustration of an example system that is operable to implement personal datastore usage techniques in a decentralized network as described herein according to an implementation of the present subject matter.

Artists are driven to create digital content in a variety of forms, from images, to music, to the written word, and so forth. One of the challenges, however, lies in an ability of the artist to expose this digital content to potential consumers of the digital content, control how access is provided to the digital content, and so forth.

In conventional scenarios, a platform provider or a content provider act as authorities to manage access and control. Such providers also act as gatekeepers to manage which items are made available via the platform to potential consumers, which helps to ensure content quality that is made available to consumers. Lack of this control in other scenarios, however, hinders digital content availability as well as an ability to control consumer access to digital content by entities associated with the digital content. Additionally, content and information associated with a particular artist is distributed amongst multiple platforms in conventional systems. For example, in conventional systems, a fan of an artist may go to a digital service provider (DSP) to consume music made by the artist, an image or video sharing platform to consume daily updates output by the artist, a discussion platform to connect with other fans of the artist and discuss topics related to the artist, and so forth. Navigation between and within each of these platforms by users to locate the content that is desired consumes considerable network and processing resources.

To address these technical challenges, techniques are described that leverage a decentralized network to provide and manage access to an artist's digital content. A personal datastore is configured on a selected decentralized node of the decentralized network and acts as a data storage repository to store data within the personal datastore. The personal datastore is accessible and locatable via a decentralized identifier associated with the personal datastore. By making access to digital content available to content consumers at a content creator's personal datastore, content creators can de-duplicate storage of the digital content across platforms, reduce payment workflows, provide information specific to the content creator (rather than default information provided by service provider systems across all content creators), and so forth. Other examples are also contemplated in which a decentralized identifier is connected to an artist, label, rights holder identity, and so forth. Decentralized identifiers are also configurable to items of content, e.g., songs, media and so forth.

In the techniques described herein, functionality is implemented in support of a personal datastore as part of a decentralized network. Personal datastore functionality is configurable to support artist upload to the personal datastore, access and personalized consumption of data from personal datastore, and collection of fees through use of personal datastore, e.g., per stream of digital content.

For an artist upload, a software development kit can be provided (e.g., by a third-party entity such as a platform provider or content provider) that surfaces a user interface to assist in upload of digital content. The user interface, for instance, is configurable to include options to specify a content type, application programming interface (API) access, accessibility by other entities, and so forth. The user interface is configurable to specify particular APIs that leverage the use of verifiable credentials to define "who can do what with what."

The software development kit is also configured to specify the digital content to be maintained as part of a personal datastore as well as access control data that defines how access to the digital content is to be managed. In one or more implementations, generative artificial intelligence (AI) techniques are supported as part of input of the access control data, such as to generate entity access control logic that is executable to control access to the digital content based on verifiable credentials.

For access, the software development kit is usable to define how the content is consumed. Access control, for instance, is usable to accept downloads for a fee, use by third-party streaming services, fan interactions, album art, and so on. The album art, for instance, may be owned by a recording studio which permits use of the album art to the artist through the personal datastore. The personal datastore also leverages an additional set of backend credentials between the artist's personal datastore and the recording studio's personal datastore. There is also an ability at the consumer side to control how the content is consumed, e.g., through customization of a user interface.

In one or more scenarios, digital content is stored at a personal datastore of the artist but access to the digital content has access controls imposed by a rights holder (e.g., a digital content publishing system such as a recording studio) on how that digital content is used. If an agreement between the artist and the rights holder is terminated, the entity access control logic can revert the digital content from the artist's personal datastore to the rights holder personal datastore, after which the digital content is deleted from the artist's personal datastore.

Additional scenarios include management of the personal data of the artist by the rights holder. In this additional scenario, the artist is not tasked with imposing access controls on the digital content for storage at the artist's personal datastore. In one or more implementations, the artist is provided with additional access privileges through entity access control logic to the personal datastore managed by the rights holder, such as to send messages to fans from a decentralized identifier (DID) associated with the personal datastore.

The software development kit is also configurable to support a payment verification module for use by the personal datastore. The payment verification module, for example, is configured to initiate collection of fees as part of controlling access to the digital content, e.g., through communication with a payment platform. The payment platform is configurable to support person-to-person payments, act as part of a centralized institution, and so forth. The payment verification module, for instance, is preconfigured for implementation as part of the payment platform including programmatic hooks, application programming interfaces, cryptographic keys, and schemas used to support standardization of payments for use by the personal datastore. The payment verification module is also configurable to allow rights holds to document compositions with digital identity and verifiable split sheets, which formalize splits ownership of content on the platform.

The decentralized identifier, for instance, is used to locate the artist by a consumer. A request is made to access the content via the personal datastore, includes the decentralized identifier of the consumer, and utilizes verifiable credentials as being "authorized" to access the digital content. Once the verifiable credentials and sufficient funds are determined by the decentralized identifier of the consumer through communication with the payment platform, access is permitted. The access, for example, is controlled through subsequent use of additional verifiable credentials that are usable to define how that access is to be performed, e.g., to permit streaming from the datastore for a period of time, etc.

In one or more additional examples, the personal datastore is associated with an "artist identity" (e.g., a decentralized identifier) stored at a decentralized node of a decentralized platform that may be severable/transportable to another decentralized node. Other examples are also contemplated in which a decentralized identifier is connected to an artist, label, rights holder identity, and so forth. Decentralized identifiers are also configurable to items of content, e.g., songs, media and so forth.

An artist, in an example of association with an artist identity, may cease a business relationship with a digital content publishing system. An agreement between the artist and the digital content publishing system indicates ownership of a first set of digital content by the digital content publishing system (e.g., digital music and album covers) and that the artist owns a second set of digital content, e.g., personal information, direct messages with fans, and so forth. Accordingly, the first set of digital content may be severed from personal information of the second set of digital content. The first set of digital content is then transferred to the digital content publishing system in this example while the second set of digital content remains accessible in the personal datastore of the artist.

For interactions by an artist taken in association with a service provider system, the service provider system in one or more examples stores the digital content in its personal datastore for the artist. The service provider system also acts as an issuer of verifiable credentials for those interactions. For instance, messages exchanged via the service provider system that result in a collaboration between two artists are validated using verifiable credentials, which adds trust to the resulting collaborative digital content created by the two artists.

In another example, the service provider system manages personal datastores for respective artists. The personal datastore, for instance, are at least partially pre-populated with digital content including data describing how the artist has interacted with the service provider system, which items of digital content created by the artist have been verified by the service provider system, and so on. Generative artificial intelligence (AI) may also be employed as part of maintaining the digital content.

In an implementation, an artist is not given control over their ISNI/IPI, it is controlled by the service provider system as a third party. Artists, however, are given control over their decentralized identifier. The ISNI/IPI third parties as implemented as credential issuers, though.

In a further example, an artist provides a service provider system with access to a personal datastore. The service provider system retrieves the digital content via the datastore (e.g., avatars, music, fan interactions, and so on) and generates an artist profile for the artist. The service provider system is configurable to verify the data by requesting proof of verifiable credentials associated with individual pieces of the digital content in the artist's datastore. The personal datastore is configurable to support a variety of additional functionalities, examples of which include compatibility with a variety of data formats (e.g., extensible markup language, JavaScript Object Notation), support of a variety of types of payments including Bitcoin or other cryptocurrencies, and so forth.

This access supports a degree of control and standardization that is not possible in conventional techniques, which improves computing device operation, network efficiency, and reduces power consumption. For example, the access is usable supports efficient navigation to locate content that is desired without navigating within each of the platforms.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

FIG. 1 is a non-limiting illustration of an example system 100 that is operable to implement personal datastore usage techniques in a decentralized network as described herein according to an implementation of the present subject matter. The illustrated system 100 includes a decentralized platform 102 implemented using a plurality of nodes (e.g., web nodes, decentralized nodes), an example of which is illustrated as node 104. The node 104 is representative of a computer or other device involved in implementation of a decentralized network, e.g., tasked with validating transactions and maintaining a copy of a blockchain ledger. The system 100 also includes a client device 106 as representative of functionality available at an "edge" of the system 100 to respective entities 108, e.g., via respective computing devices.

The node 104 of the decentralized platform and the client device 106 are communicatively coupled, one to another, via a network 110. The client device 106, for instance, includes a communication system that includes hardware and software functionality to support network communication, e.g., including a modem, browser, a network-enabled application, an applet, and so forth. Likewise, the system 100 also includes a digital content publishing system 112 that is implemented using one or more computing devices. The digital content publishing system 112 is configurable to expose digital content for consumption to client devices, e.g., via streaming, download, and so forth. The digital content publishing system 112 is configurable as a centralized authority, distributable across a plurality of nodes in a decentralized implementation, and combinations thereof.

Computing devices that implement the system 100 (e.g., the client device 106 and/or the digital content publishing system 112) are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as part of a service provider system.

The node 104 includes a node manager module 114 having functionality in support of communication and message relay between the nodes 104 of the decentralized platform 102 as well as with the client device 106 and the digital content publishing system 112 via the network 110. Examples of functionality to do so include a data storage module 116 and a message relay module 118. The data storage module 116 is configured to collect and maintain decentralized identifier data 120, which is illustrated as maintained in a storage device 122. The decentralized identifier data 120 is formatted to support decentralized authentication and routing as performed by the message relay module 118, e.g., for communication between nodes and/or with the client device 106 and digital content publishing system 112 via the network 110.

The client device 106 includes a decentralized identifier module 124. The decentralized identifier module 124 is configured to manage use of a decentralized identifier 126. Likewise, the client device 106 also includes a verifiable credential module 128 that is configured to manage use of one or more verifiable credentials 130.

A decentralized identifier 126 is configured as a self-owned identifier that supports decentralized authentication and routing. A self-owned identifier in a blockchain network is a unique identifier that is owned and controlled by an individual entity (e.g., on a blockchain), also referred to as a "self-sovereign identity," as contrasted with an entity controlled by a centralized authority (e.g., service provider system) that is vulnerable to attacks, hacks, and data breaches. The decentralized identifier 126 is configurable without use of subjective consensus as implemented using a conventional centralized service provider, but rather are self-generated and self-owned. Persistence of the decentralized identifier 126 is maintainable via local storage and are resistant to interruption or stoppage by outside forces or authorities. The decentralized identifier 126 is also universally indexed and discoverable as part of the decentralized identifier data 120.

The verifiable credential 130 employs a data format for cryptographic presentation and verification of claims. The verifiable credential 130, for instance, supports standardized mechanisms to express and verify qualifications, privileges, and other assertions made by an entity, e.g., via a corresponding decentralized identifier. For example, the verifiable credential 130 is usable to provide a digital version of physical credentials such as a passport or driver's license. An issuing authority generates the verifiable credential as having a cryptographic proof that is employed to verify authenticity of the verifiable credential. An entity that possesses the verifiable credential 130 may then present the credential to another entity as proof of an assertion. The other entity may then use the cryptographic proof to ensure validity of the credential, e.g., was issued by a corresponding credential issuer system.

Verifiable credentials are then used as part of access control by the personal datastore, e.g., through authorization of the credentials. A verifiable credential, for instance, is usable to validate that a claim made by a holder of the verifiable credential is true, which is validated by an issuer of the verifiable credential. A decentralized identifier (DIDs) is usable to identify a respective entity, e.g., user, service provider system, and so forth. Decentralized identifiers, for instance, are used to identify a respective entity in a manner that is globally unique and is cryptographically verifiable. Decentralized identifiers are configurable through a decentralized platform (e.g., using a blockchain or other distributed ledger technique implemented as part of a decentralized platform) to securely authenticate an identity of a corresponding entity.

Verifiable credentials are usable to validate a claim made by a corresponding entity, e.g., associated with a decentralized identifier as described above. Verifiable credentials, for instance, include a cryptographic proof that is usable to validate authenticity, e.g., through communication with an issuer of the verifiable credentials. Verifiable credentials are configurable to support standardization of qualifications, affiliations, privileges, or other claims about a corresponding decentralized identity. Accordingly, a decentralized identity acts as a subject of the verifiable credentials that is authenticated to validate that the entity "is who they say they are" and the verifiable credentials support authorization, e.g., a bearer of the verifiable credentials has a right to perform a corresponding action.

The node 104 of the decentralized platform 102, as representative of one of a plurality of decentralized nodes (e.g., decentralized web nodes), supports data storage and relays that allows entities, service provider systems, individuals, organizations and so forth to send, store, and receive encrypted or public messages and data. The node 104 is universally addressable and is "crawlable" using data addressing in relation to the decentralized identifiers. The node 104 is also configured to support decentralized replication of data across the nodes that is "eventually consistent" (e.g., the data is consistent across the nodes over time through continued data communication between the nodes) through communication of instances across individual nodes in the decentralized platform 102. The node 104 supports secure encryption through use of a cryptographic key associated with an individual's decentralized identifier.

The node 104 is further configured to implement a personal datastore 132 having entity access control logic 134. The personal datastore 132 is configured to support control by the entity 108 and/or the digital content publishing system 112 of digital content 136, e.g., using the decentralized identifier 126 and verifiable credential 130. The digital content 136 may be configured to store a variety of data, such as text, images, video, audio, digital documents, communications, transaction information, and so forth.

As part of this, the client device 106 includes a datastore application 138 that leverages functionality of the decentralized identifier module 124 and the verifiable credential module 128. The datastore application 138 is configured to generate personal datastore data 140, which in the illustrated instance includes the digital content 136 and access control data 142 to control implementation of the personal datastore 132 using entity access control logic 134 to manage access by and permissioning of applications and/or content to consumers 144 via respective computing devices.

As previously described, entities 108 including artists and other "creatives" are driven to create digital content 136 in a variety of forms, from images, to music, to videos, to the written word, and so forth as illustrated in FIG. 1. A challenge, however, lies in an ability of the entities 108 to expose this digital content 136 to potential consumers 144 in a computationally efficient way, how to control access to the digital content 136, and so forth.

In conventional scenarios, a platform provider acts as a centralized authority using digital services to directly manage access and control to digital content maintained at the platform for access over a network. The platform provider also acts as a gatekeeper to manage which items are made available via the platform to potential consumers, which helps to ensure content quality that is made available to consumers but yet also restricts what digital content is available to the consumers. Lack of this control in other scenarios, however, hinders digital content availability as well as an ability to control consumer access to digital content by entities associated with the digital content. Additionally, content and information associated with a particular artist is distributed amongst multiple platforms in conventional systems. For example, in conventional systems, a fan of an artist may go to a digital service provider (DSP) to consume music made by the artist, an image or video sharing platform to consume daily updates output by the artist, a discussion platform to connect with other fans of the artist and discuss topics related to the artist, and so forth. Navigation between and within each of these platforms by users to locate the content that is desired consumes considerable network and processing resources.

To address these technical challenges caused by lack of standardization, lack of client control, and navigational inefficiencies, a personal datastore 132 is configured on a select node 104 of the decentralized platform 102 to leverage a decentralized network to provide and manage access to an artist's digital content 136. The personal datastore 132 is accessible and locatable via the decentralized identifier 126 of the entity 108 associated with the personal datastore 132. The verifiable credential 130 may also be used as part of access control by the personal datastore 132, e.g., through authorization of the credentials by the verifiable credential module 128. The verifiable credential 130, for instance, is usable to validate that a claim made by a holder of the verifiable credential 130 is true, which is validated by an issuer of the verifiable credential. Decentralized identifiers (DIDs) are usable to identify a respective entity, e.g., user, service provider system, the digital content publishing system 112, and so forth.

The personal datastore 132 and datastore application 138 are usable to support a variety of functionalities. Examples of these functionalities include entity 108 upload to the personal datastore 132, access and personalized consumption of digital content 136 from the personal datastore 132, and collection of fees through use of personal datastore 132, e.g., per stream of digital content provided to the consumers 144.

To do so in one or more examples, a software development kit (SDK 146) is provided to assist in generation and usage of the personal datastore 132. The SDK 146, for instance, includes a collection of preconfigured code that is usable to implement corresponding functionality to control how digital content 136 is maintained at the personal datastore 132. The SDK 146 is further configurable to generate access control data 142 specifying application programming interfaces having rules and protocols implemented by the entity access control logic 134 to control access to the digital content 136 via the personal datastore 132. The SDK 146 is also configurable to include a variety of other functionalities, examples of which include development tools, integrated development environments, debuggers, implementation of a testing runtime environment, and so forth. Thus, the SDK 146 is configurable to assist in generation of the personal datastore 132 for implementation as part of the decentralized platform 102 as further described below.

In some implementations,

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Figure 2:
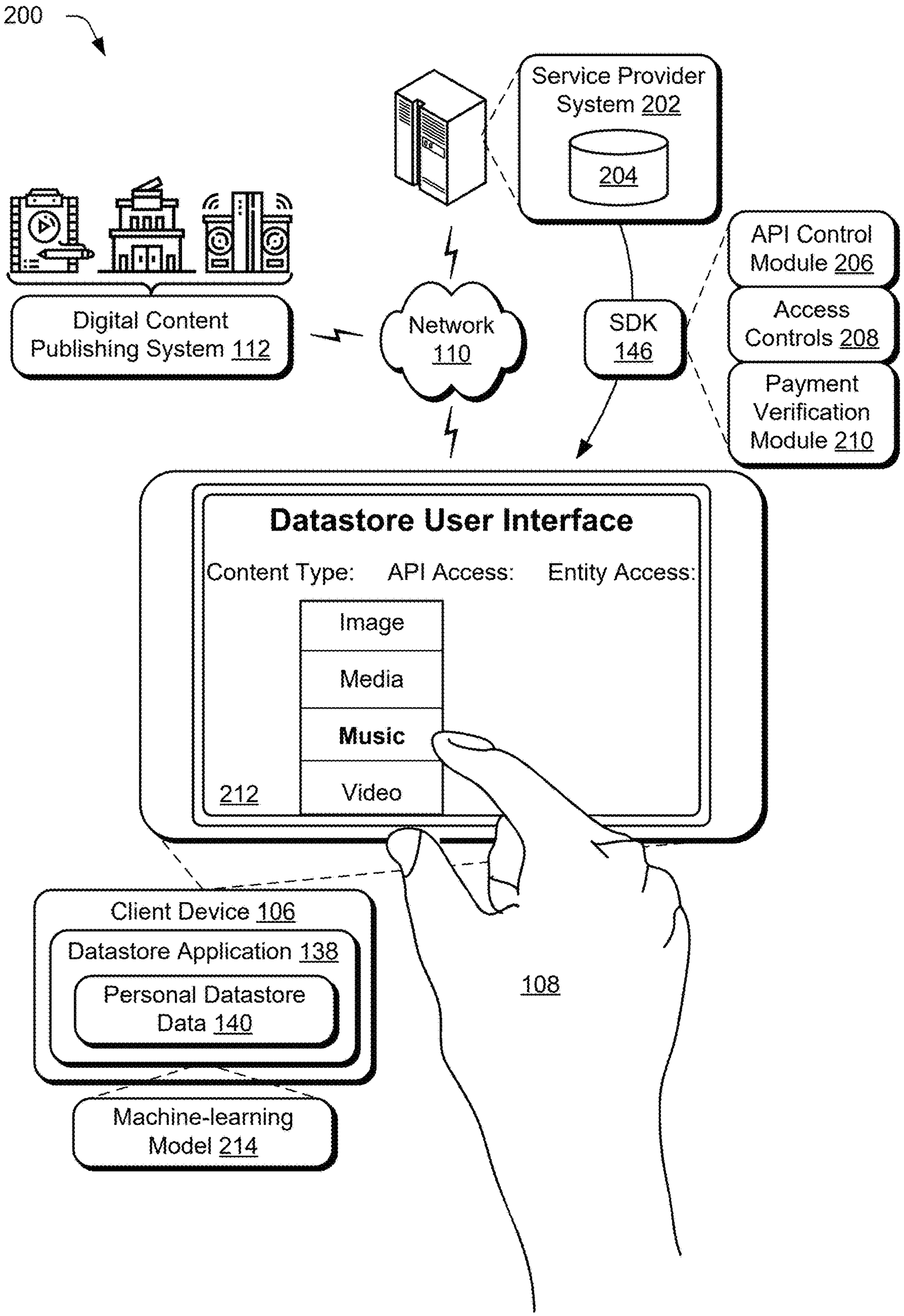
FIG. 2 is a non-limiting illustration of an example system that is operable to implement use of a software development kit to generate a personal datastore in a decentralized network as described herein according to an implementation of the present subject matter.

FIG. 2 is a non-limiting illustration of an example system 200 that is operable to implement use of a software development kit to generate a personal datastore in a decentralized network as described herein according to an implementation of the present subject matter. In the illustrated example, a service provider system 202 transmits the SDK 146 from a storage device 204, e.g., via the network 110. The service provider system 202, for instance, is configured to implement one or more digital services that leverage use of the decentralized platform 102. Examples of digital services implemented by the service provider system 202 include operation as part of a ledger system, support of payments at a point-of-sale using assets associated with user accounts in a peer-to-peer environment, support provision of digital content 136 (e.g., as a digital content streaming service), and so on. The SDK 146, for instance, is provided in response to receipt of a fee, signup for digital services of the service provider system 202, and so forth.

The SDK 146 is configured for execution at the client device 106 for use in generating the personal datastore 132, provisioning the personal datastore 132 with digital content 136, and controlling how access is granted to the digital content 136 via the personal datastore 132. Examples of this functionality are represented as an API control module 206, access controls 208, and payment verification module 210.

The SDK 146, for instance, is executed via the datastore application 138 at the client device 106. Execution of the SDK 146 causes output of a user interface 212 to assist in generating and provisioning the personal datastore 132. The SDK 146 is usable to select a node 104 from a plurality of nodes of the decentralized platform 102. The decentralized identifier 126 of the entity 108 is associated with that node 104, which is then usable to locate the node 104 using decentralized identifier data 120 as further described in relation to FIG. 5.

The SDK 146, for instance, through use of the decentralized identifier module 124 is usable to create a decentralized identity (DID) document (e.g., as a JavaScript Object Notation object) that includes information relating to the entity 108, e.g., public encryption keys and service endpoints. The DID document is then registered with the decentralized platform 102 as part of the decentralized identifier data 120 (e.g., by writing the document to a blockchain) and associated with the node 104.

Figure 5:
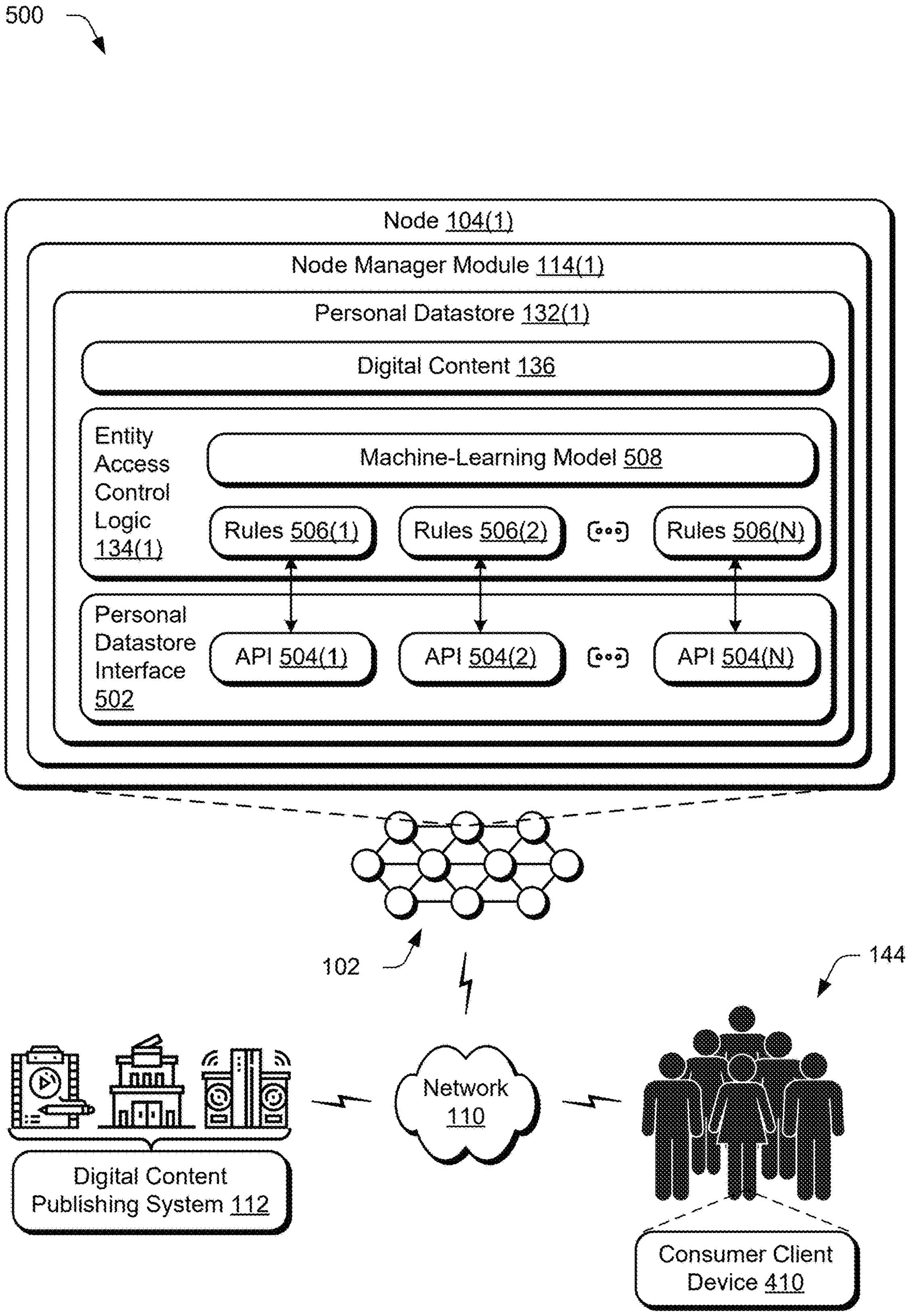
FIG. 5 is a non-limiting example showing operation of a personal datastore associated with an entity, as executed by a node of FIG. 4, configured to control exposure of digital content using respective application programming interfaces according to an implementation of the present subject matter.

The SDK 146 is also configured to generate a personal datastore 132, via which, digital content 136 is to be made available via the selected node 104 of the decentralized platform 102. In one or more examples, the SDK 146 generates a user interface 212 which includes representations that are selectable to indicate a content type of the digital content 136 to be made available via the personal datastore 132, application programming interface (API) of the personal datastore 132 that are to be used to access the digital content 136, entities and respective verifiable credentials that are permitted access to the digital content 136 of the personal datastore 132 via respective APIs as shown in FIG. 5, and so forth. The access controls 208, for instance, are usable to accept decentralized identifiers of particular entities to control access. Thus, in this instance access is controlled to particular entities as identified by respective decentralized identifiers.

In some instances, the access controls 208 are usable to control access based on a verifiable credential 130. The verifiable credential 130, for instance, is usable to validate a claim made by a corresponding entity, e.g., has made a purchase, has membership in a particular group, paid a subscription fee, and so forth. The verifiable credential 130 includes a cryptographic proof that is usable to validate authenticity of the credential, e.g., through communication with an issuer of the verifiable credentials. The verifiable credential 130 is configurable to support standardization of qualifications, affiliations, privileges, or other claims to a bearer of the verifiable credential. Accordingly, a decentralized identity is authenticated to validate that the entity "is who they say they are" and the verifiable credential supports authorization, e.g., a bearer of the verifiable credentials has a right to perform a corresponding action, access a particular item of digital content via the personal datastore 132, and so forth. A variety of other examples are also contemplated.

For access, the SDK 146 is also usable to define how the digital content 136 is consumed, e.g., streamed, downloaded, and so forth. Access controls 208 are also usable to accept downloads for a fee, permit use by third-party streaming services, enable fan interactions, disseminate album art, and so on. Album art, for instance, may be owned by the digital content publishing system 112 which permits use of the album art by the entity 108 (e.g., the artist) through the personal datastore 132.

The datastore application 138, through use of the SDK 146, is also configurable to leverage use of a machine-learning model 214 to support generation of the personal datastore data 140. The machine-learning model 214, for instance, is configurable to implement generative artificial intelligence (AI) to support queries and configuration of the user interface 212 to input the personal datastore data 140. The machine-learning model 214 is usable to implement a question-and-answer session in which the generative AI is used to expand insight into the digital content 136 being uploaded, configuration of access controls to control access to the personal datastore data 140, assignment to a respective API based on the type of digital content or access controls, configuration of payment information as part of the payment verification module 210, and so on.

Figure 3:
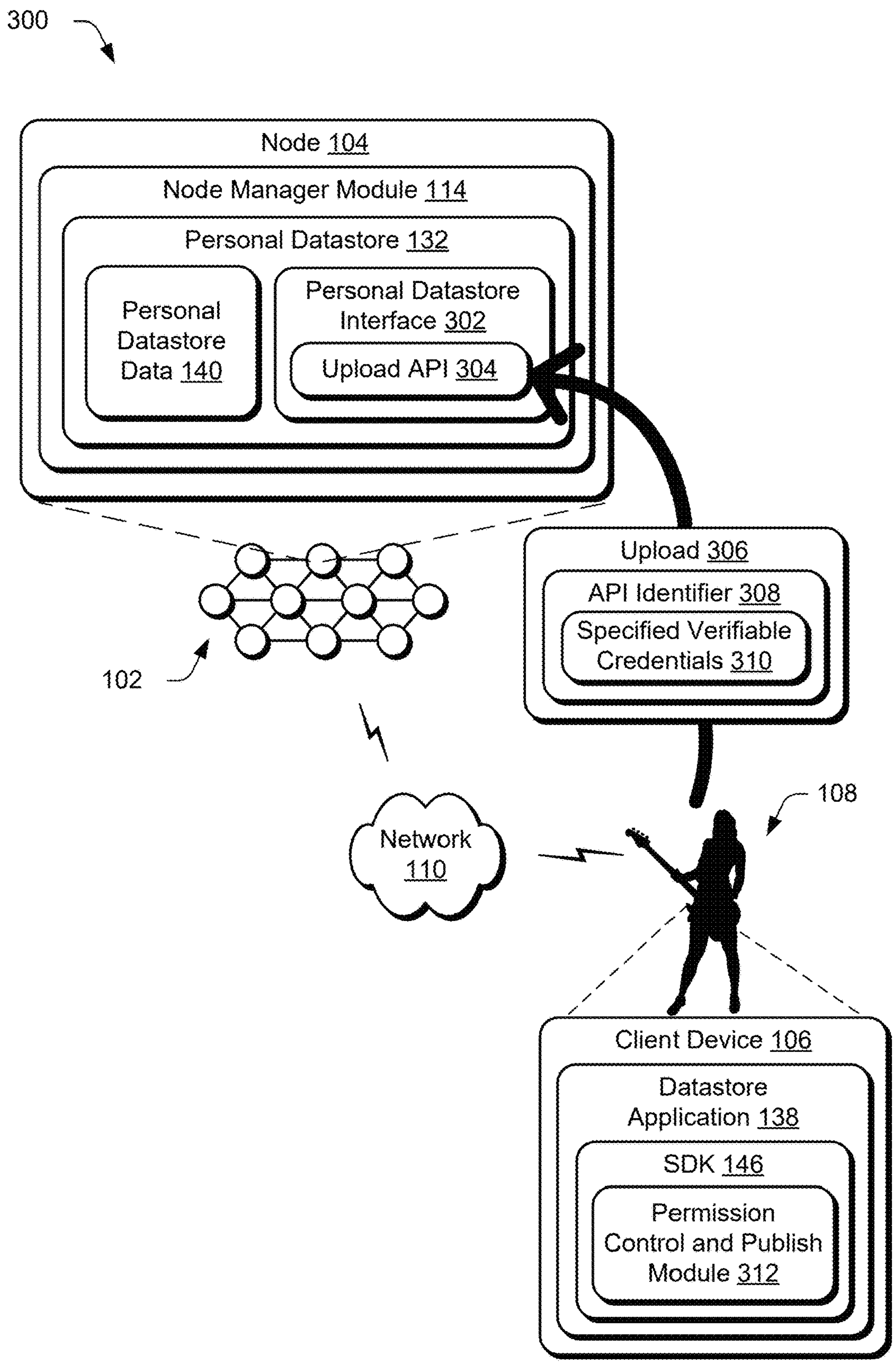
FIG. 3 is a non-limiting illustration of an example system that is operable to implement use of a software development kit to generate an upload to a personal datastore in a decentralized network as described herein according to an implementation of the present subject matter.

FIG. 3 is a non-limiting illustration of an example system 300 that is operable to implement use of a software development kit to generate an upload to a personal datastore in a decentralized network as described herein according to an implementation of the present subject matter. In this example, the datastore application 138, through execution of the SDK 146, accesses a personal datastore interface 302 having an upload API 304. The SDK 146 then initiates an upload 306 of the personal datastore data 140 to be maintained as part of the personal datastore 132 at the node 104 in the decentralized platform 102.

In the illustrated example, the upload 306 includes an API identifier 308 that specifies an API of a plurality of APIs, via which, the personal datastore data 140 that is a subject of the upload is to be made available as further described in relation to FIG. 5. The upload 306 also includes specified verifiable credentials 310 that are to be used as a basis to gain access to the personal datastore data 140 at the personal datastore 132. The specified verifiable credentials 310, as previously described, are usable to validate a claim made by a holder of the credential, e.g., made a purchase, joined a fan club, etc. Accordingly, the specified verifiable credentials 310 are usable as part of access control such that access to the personal datastore data 140 (e.g., digital content 136) is limited to those entities having the specified verifiable credentials 310.

Once uploaded, the SDK 146 employs a permission control and publish module 312 that is usable to verify operation of the personal datastore data 140 as intended by the personal datastore 132. Once verified, an option is supported to publish the personal datastore data 140 by the permission control and publish module 312 as available via the personal datastore 132 over the decentralized platform 102 as further described in the following example.

Figure 4:
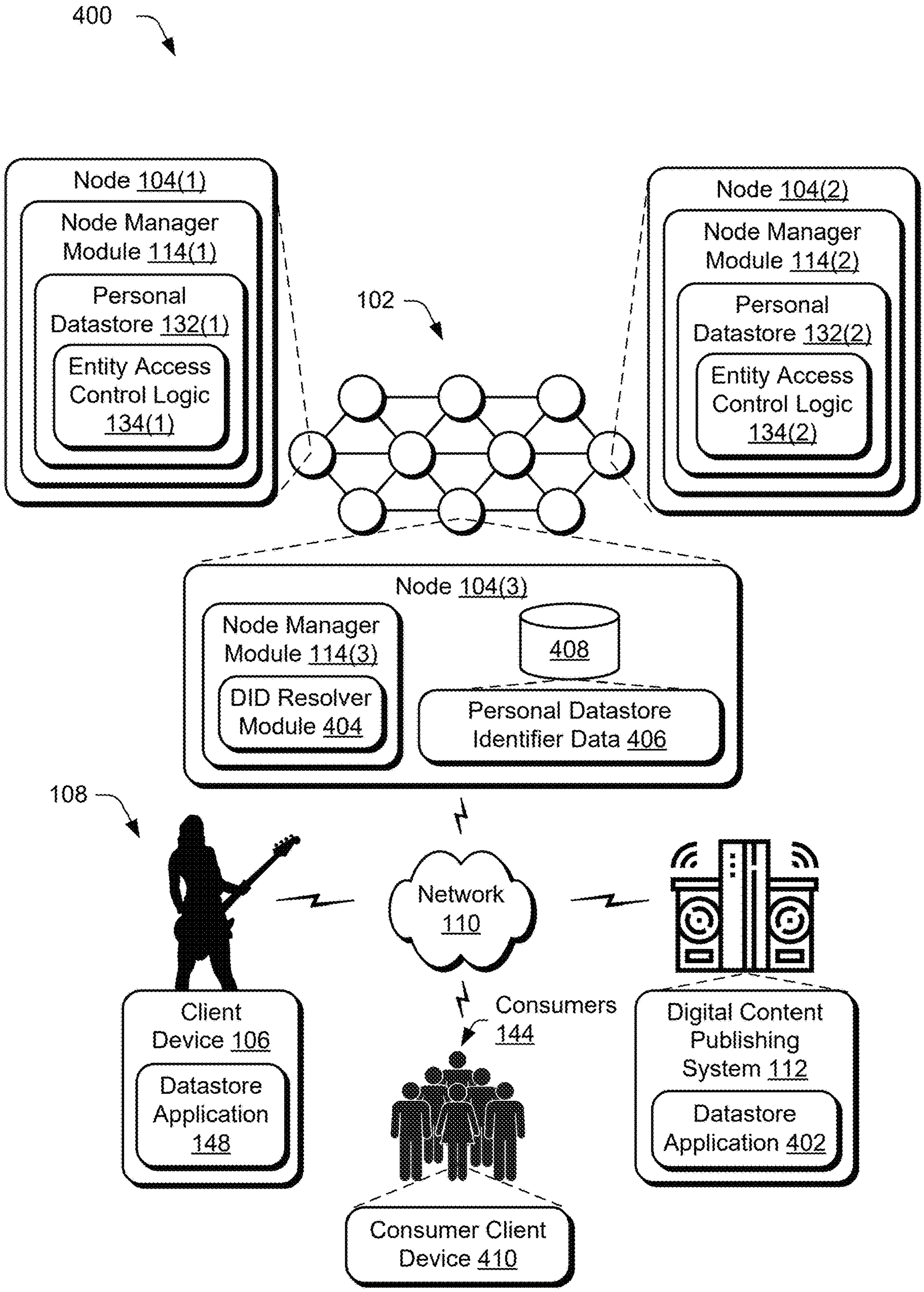
FIG. 4 is a non-limiting illustration of an example system that is operable to resolve a decentralized identifier to a personal datastore in a decentralized network as described herein according to an implementation of the present subject matter.

FIG. 4 is a non-limiting illustration of an example system 400 that is operable to resolve a decentralized identifier to a personal datastore in a decentralized network as described herein according to an implementation of the present subject matter. The system 400 includes an entity 108 and associated client device 106 as executing the datastore application 148. Likewise, the digital content publishing system 112 is illustrated as executing a respective datastore application 402. The entity 108, digital content publishing system 112, and consumers 144 are communicatively coupled, one to another, via the network 110.

The illustrated implementation also includes examples of nodes 104 in a decentralized platform 102, which includes nodes 104(1), 104(2), 104(3) having respective node manager modules 114(1), 114(2), 114(3). Node 104(1) is associated with a decentralized identifier associated with a respective entity 108 that created the digital content 136. This node 104(1) includes entity access control logic 134(1) to control access by a node manager module 114(1) to a personal datastore 132(1) as previously described.

Similarly, node 104(2) is associated with a decentralized identifier identifying the digital content publishing system 112 that is a rights holder and is tasked with dissemination of the digital content 136. This node 104(2) also includes entity access control logic 134(2) to control access by a node manager module 114(2) to a respective personal datastore 132(2).

Node 104(3) in the illustrated implementation includes a DID resolver module 404 that leverages personal datastore identifier data 406 maintained in a storage device 408. The DID resolver module 404 is usable to assist in resolving decentralized identifiers of the client device 106 and the digital content publishing system 112 to locate the personal datastores 132(1), 132(2) via the decentralized platform 102. To do so in one or more examples, a consumer client device 410 of the consumers 144 parses a respective decentralized identifier 126 to locate a corresponding decentralized platform 102 used to implement the decentralized identifier 126. The decentralized identifier 126 is then resolved based on techniques defined for the decentralized platform 102.

The consumer client device 410 contacts the DID resolver module 404 of the node 104(3). The DID resolver module 404 utilizes the personal datastore identifier data 406 to fetch a DID document, which is configurable as a JavaScript Object Notation (JSON) object that includes information about the decentralized identifier 126. This information includes public keys and service endpoints usable to locate the node 104(1) in the decentralized platform 102 corresponding to the decentralized identifier 126 of the entity 108 in this example. From this information, the consumer client device 410 locates the personal datastore 132(1), which is usable to access personal datastore data 140 associated with the entity 108 as further described in the following example and shown using a corresponding figure.

FIG. 5 is a non-limiting example 500 showing operation of a personal datastore 132(1) associated with the entity 108, as executed by a node 104(1) of FIG. 4, configured to control exposure of digital content 136 using respective application programming interfaces according to an implementation of the present subject matter. The personal datastore 132(1) in this example includes a personal datastore interface 502 and entity access control logic 134(1). The personal datastore interface 502 includes a plurality of application programming interfaces (APIs), examples of which are illustrated as API 504(1), API 504(2), . . . , API 504(N).

Each of these APIs has associated rules 506(1), 506(2), . . . , 506(N) implemented as part of the entity access control logic 134(1) to control access to respective portions of the digital content 136. Through use of the different APIs 504(1)-504(N), access is provided to different items and portions of the digital content 136 to different entities and associated devices, e.g., to the digital content publishing system 112, the consumer client device 410 of the consumers 144, and so forth.

The APIs 504(1)-504(N) are configurable in a variety of ways, such as uniform resource locators (URLs), uniform resource identifiers (URIs), through use of decentralized identifiers, and so forth. Decentralized identifiers (DIDs) are configurable as uniform resource identifiers (URIs) that associate a DID subject with a DID document, thereby supporting trustworthy interactions associated with that subject. Decentralized identifier (DID) documents, which are linked to the decentralized identifiers, are configurable as a metadata file that includes a variety of data elements as previously described, examples of which include cryptographic material and routing endpoints. Cryptographic material is usable by an entity that is associated with the decentralized identifier to provide control, e.g., through use of public keys, digital signatures, and so forth. Through use of the decentralized identifiers, the personal datastore 132(1) associated with the particular entity (e.g., entity 108 as an artist) is locatable by a variety of entities.

Verifiable credentials are also usable as part of access control to the digital content 136 in the personal datastore 132(1) by the entity access control logic 134(1). As previously described verifiable credentials are usable to validate a claim made by an entity, which in this example is usable to control access to respective APIs 504(1)-504(N) of the personal datastore interface 502. Accordingly, the upload 306 as implemented by the SDK 146 is usable to specify the rules 506(1)-506(N) and respective verifiable credentials, possession of which by a respective entity is usable to permit or restrict access to the digital content 136 maintained within the personal datastore 132(1). In this way, the entity access control logic 134(1) is configurable to control access to the digital content 136 of the personal datastore 132(1) in a variety of usage scenarios. Examples of which include support of payments at a point-of-sale using assets associated with user accounts in a peer-to-peer platform, support provision of digital content 136 (e.g., as a digital content streaming service), and so on.

The rules 506(1) associated with API 504(1) for instance, may specify verifiable credentials associated with payments in a peer-to-peer payment platform to access digital content 136 associated with an asset transfer. The verifiable credentials, in one or more examples, are issued by a credential issuer system to attest that an entity is a member of the platform. The verifiable credentials are then verified as being authentic using a cryptographic proof by the entity access control logic 134(1). Once validated, access to digital content 136 pertaining to the payment platform is permitted, e.g., to access user information usable to implement the payments such as driver's license information, employment data, tax returns, and so forth. Thus, in this example the verifiable credential acts as a digital authorization to then obtain additional information usable as a basis to increase a level of trust in order to perform a transaction.

The rules 506(2) associated with API 504(2) on the other hand, may specify verifiable credentials associated with access to digital content 136, e.g., via digital services used to stream the digital content 136, provide the digital content 136 for download, and so forth. The verifiable credentials, for instance, may specify membership by the consumer client device 410 in a digital music streaming service, memorialize purchase of digital content or access to the digital content (e.g., for a period of time) made available via the API 504(2), and so forth.

The entity access control logic 134(1) is also configurable to leverage a machine-learning module 508 to aid in control of access to the digital content 136, how digital content 136 is maintained at the personal datastore 132(1), and so forth. The machine-learning module 508, for instance, may be trained and retrained based on monitored user interaction to queue particular items of digital content 136 as made available for load balancing, which items of digital content are made available via respective APIs based on the type of digital content, and so forth.

Figure 6:
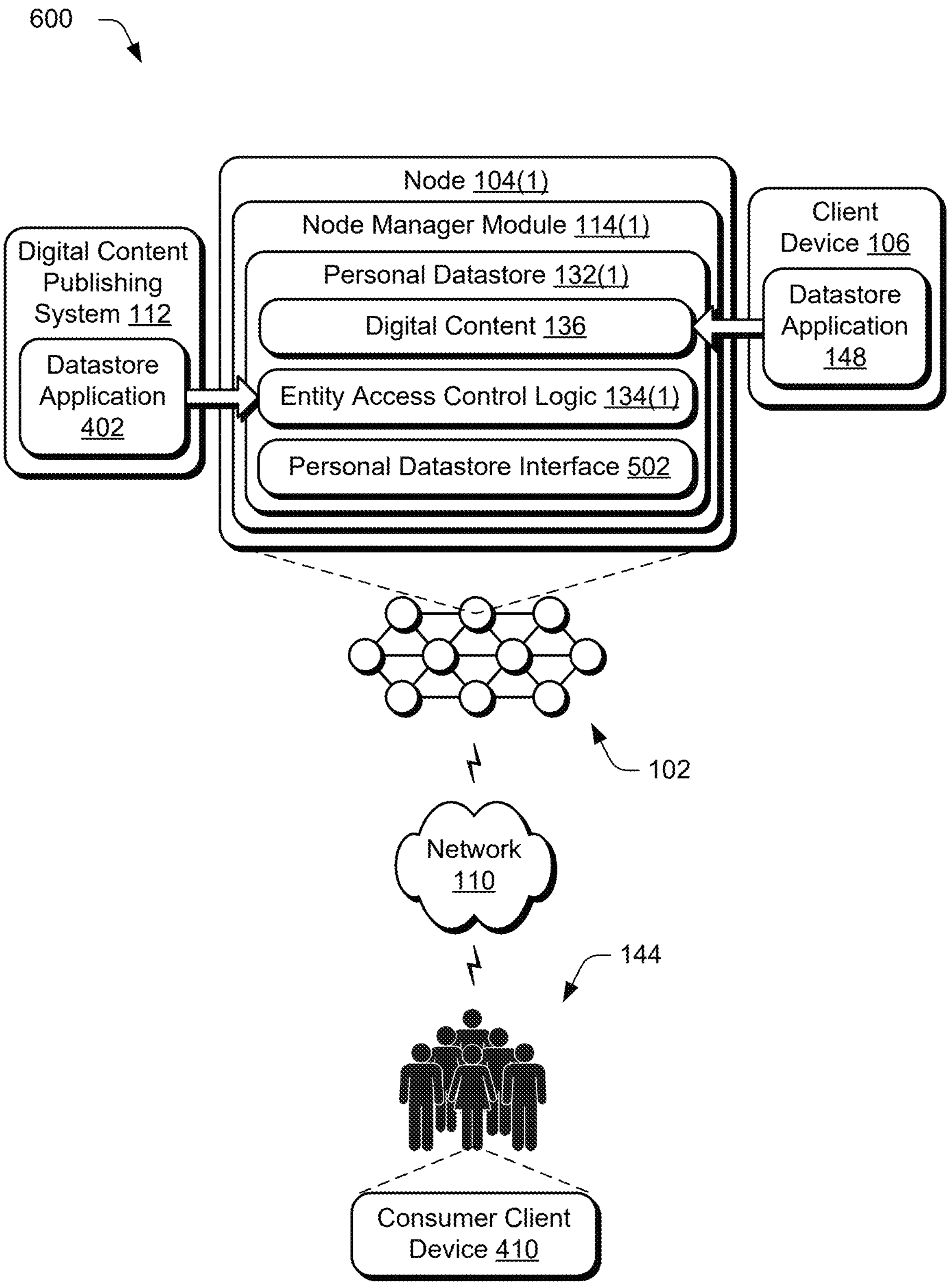
FIG. 6 is a non-limiting example showing operation of a personal datastore, as executed by a node, in which a digital content publishing system is configured to control exposure of digital content of the client device according to an implementation of the present subject matter.

FIG. 6 is a non-limiting example 600 showing operation of a personal datastore 132(1), as executed by a node 104(1), in which a digital content publishing system 112 is configured to control exposure of digital content 136 of the client device 106 according to an implementation of the present subject matter. In this example, the datastore application 148 of the client device 106 associated with the entity 108 is executed to provide digital content 136 for exposure by the personal datastore 132(1). The personal datastore 132(1) is maintained at a node 104(1) associated with the entity 108 as previously described in relation to FIG. 3. The entity 108, for instance, is an artist and the digital content 136 is created by the artist in conjunction with the digital content publishing system 112, e.g., as a record label, book publisher, brand partner, and so forth.

Accordingly, in this example, the respective datastore application 402 of the digital content publishing system 112 is a rights holder to the digital content 136. The digital content publishing system 112 is tasked with setting the entity access control logic 134(1) to control access to the digital content 136 as maintained in the personal datastore 132(1) associated with the entity 108. As a result, access to the digital content 136 of the entity 108 by the consumer client device 410 of the consumers 144 via the personal datastore interface 502 is controlled by the digital content publishing system 112 as a rights holder.

In this scenario, the entity 108 is not tasked with imposing access controls on the digital content 136 for storage at the entity's personal datastore 132(1). In one or more implementations, the entity 108 is provided with additional access privileges through the entity access control logic 134(1) to the personal datastore 132(1). The additional access privileges are managed by the rights holder (e.g., the digital content publishing system 112), such as to send messages to fans from a decentralized identifier (DID) associated with the personal datastore. In this way, the entity 108 and associated digital content in the personal datastore is locatable without involving consumer navigation to multiple content platforms, as in conventional systems. Additionally, the rights holder can set access controls to multiple different forms of digital content located at the personal datastore without having to manage communications regarding access among multiple platforms, as was the case with conventional systems. Additional scenarios include management of the associated content of the entity 108 by the rights holder as further described below.

Figure 7:
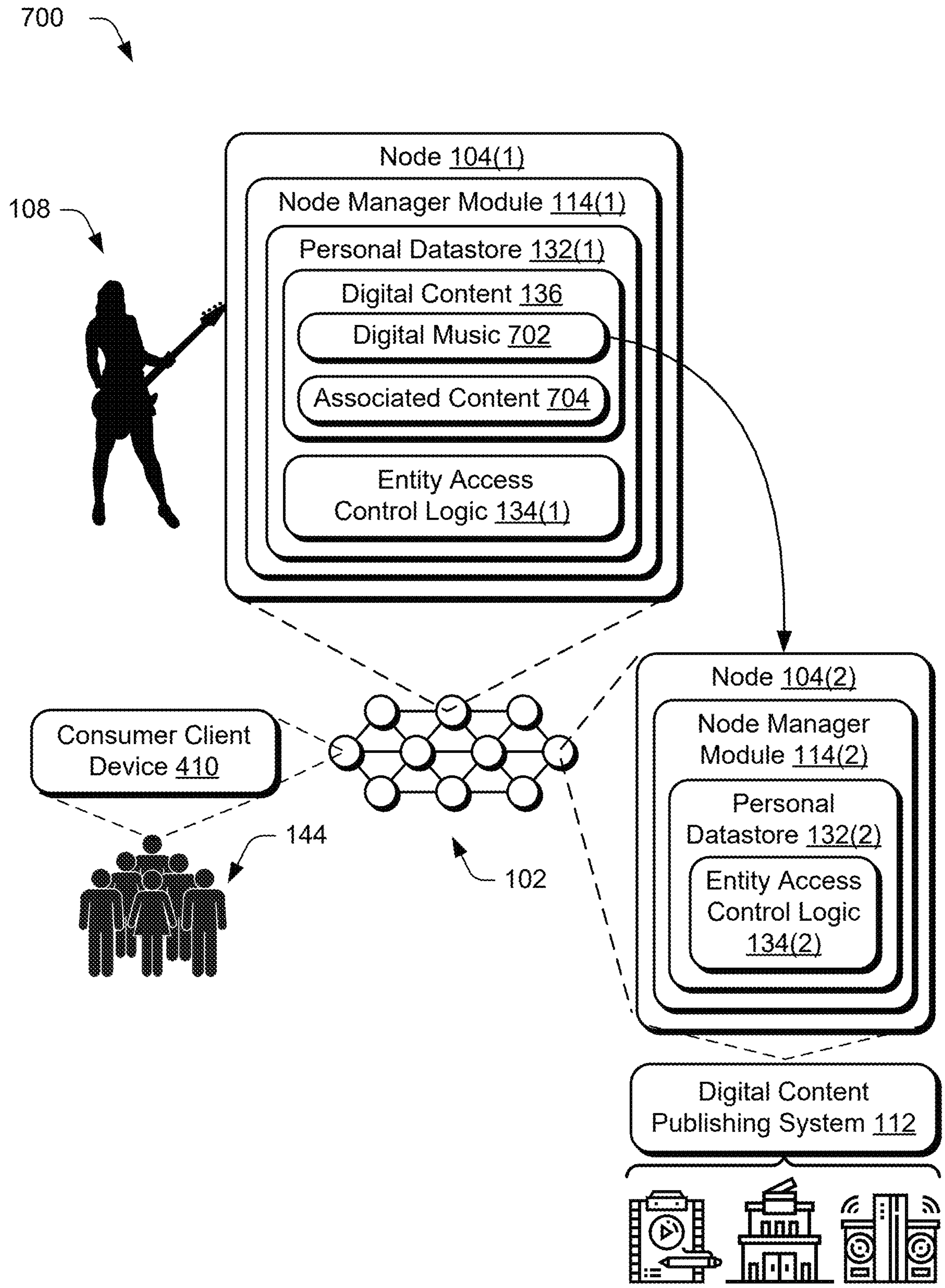
FIG. 7 is a non-limiting example showing operation of a personal datastore as associated with an artist identity stored at a decentralized node of a decentralized platform that is severable and transportable to another decentralized node according to an implementation of the present subject matter.

FIG. 7 is a non-limiting example 700 showing operation of a personal datastore as associated with an "artist identity" stored at a decentralized node of a decentralized platform that is severable and transportable to another decentralized node according to an implementation of the present subject matter. Continuing with the previous example, the entity access control logic 134(1) is managed by a digital content publishing system 112. The digital content 136 in this example includes digital music 702 and associated content 704, although any form of digital content is contemplated. The digital music 702 is created in conjunction with the digital content publishing system 112 that is a rights holder to the digital music 702.

The entity 108 is provided in this example by the digital content publishing system 112 with additional access privileges through the entity access control logic 134(1) to the personal datastore 132(1). The entity 108, for instance, is provided with an ability to send messages to fans from a decentralized identifier (DID) associated with the personal datastore. The messages thus form the associated content 704 in this example.

The artist identity stored by the personal datastore 132(1) at the node 104(1) of the decentralized platform 102 is severable and transportable to another personal datastore 132(2) of another decentralized node 104(2), e.g., associated with the digital content publishing system 112. The entity 108, for instance, may cease a business relationship with a digital content publishing system 112. An agreement between the entity 108 and the digital content publishing system 112 as implemented and controlled by the entity access control logic 134(1) indicates ownership of a first set of digital content by the digital content publishing system 112, e.g., the digital music 702, album covers, and so on. On the other hand, the entity 108 owns a second set of digital content, e.g., the associated content 704 which includes personal information, direct messages with fans, and so forth.

Accordingly, the first set of digital content (e.g., the digital music 702) may be severed from personal information of the entity 108 in the second set of digital content, e.g., the associated content 704. The digital music 702 is then transferred to the personal datastore 132(2) associated with the digital content publishing system 112 in this example while associated content 704 remains accessible in the personal datastore 132(1) of the entity 108. As a result, the entity access control logic 134(1) is usable to control data migration between personal datastores 134(1), 134(2) based on a variety of criteria, automatically and without user intervention. In examples, the entity access control logic 134(1) causes the data migration between personal datastores upon the occurrence of a triggering event, such as a date and/or time set by the entity 108 and/or the digital content publishing system 112, completion of a task, failure to complete a task by a predetermined date and/or time, the occurrence of a transaction between the entity 108 and the digital content publishing system 112, and so forth.

Figure 8:
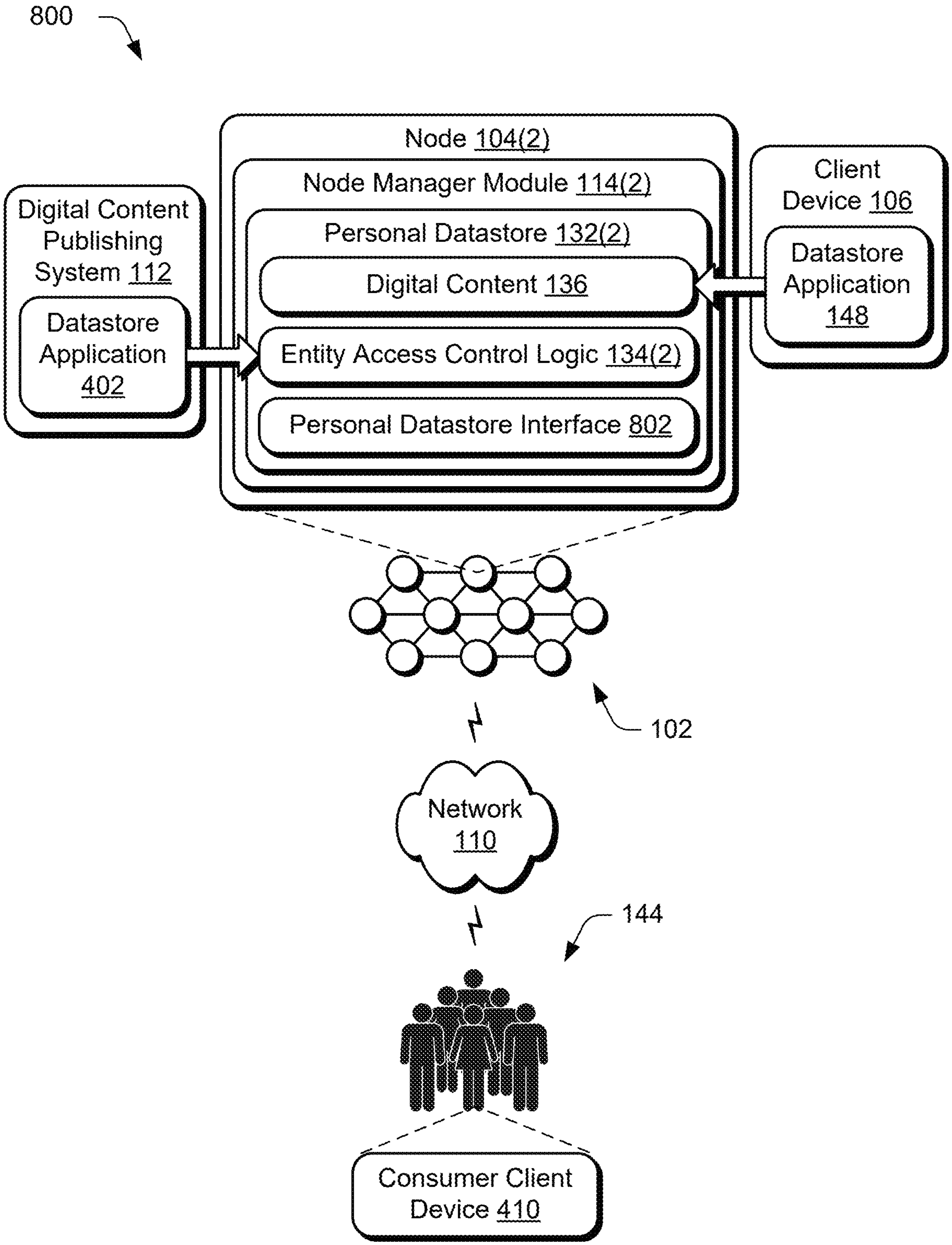
FIG. 8 is a non-limiting example showing operation of a personal datastore, as executed by a node, associated with a digital content publishing system to control exposure of digital content according to an implementation of the present subject matter.

FIG. 8 is a non-limiting example 800 showing operation of a personal datastore 132(2), as executed by a node 104(2), associated with a digital content publishing system 112 to control exposure of digital content 136 according to an implementation of the present subject matter. Like above, the datastore application 148 of the client device 106 associated with the entity 108 is executed to provide digital content 136. However, in this example the digital content publishing system 112 as a service provider system manages the personal datastore 132(2) directly for the entity 108. In some cases, the entity 108 has additional access to data and/or the digital content 136 stored in the personal datastore 132(2) than other users accessing the personal datastore, via access controls set by the digital content publishing system 112. For instance, the entity 108 may be permitted, via the access controls, to send messages to and view messages from other users that are stored in the personal datastore 132(2), comment boards, and so forth.

In one or more implementations, the personal datastore 132(2) is at least partially pre-populated with digital content 136. The digital content 136, for instance, includes data describing how the entity 108 (e.g., artist) has interacted with the digital content publishing system 112, which items of digital content created by the entity 108 have been verified by the digital content publishing system 112, and so on.

Generative artificial intelligence (AI) may also be employed as part of maintaining the digital content. Generative AI, for instance, is usable as previously described to configure the digital content 136 for inclusion by the node 104(2), configure the entity access control logic 134(2) based on one or more inputs, and control access to the digital content 136 via respective APIs as described in relation to FIG. 5.

Continuing with the previous example, the entity 108 is an artist and the digital content 136 is created by the artist in conjunction with the digital content publishing system 112, e.g., as a record label, book publisher, and so forth. Accordingly, in this example, the respective datastore application 402 of the digital content publishing system 112 is a rights holder to the digital content 136. The digital content publishing system 112 is therefore tasked with setting the entity access control logic 134(2) to control access to the digital content 136 as maintained in the personal datastore 132(2) associated with the digital content publishing system 112. As a result, access to the digital content 136 of the entity 108 by the consumer client device 410 of the consumers 144 via the personal datastore interface 802 is controlled by the digital content publishing system 112 as a rights holder. Like the previous scenario, the entity 108 is not tasked with imposing access controls on the digital content 136 for storage.

Figure 9:
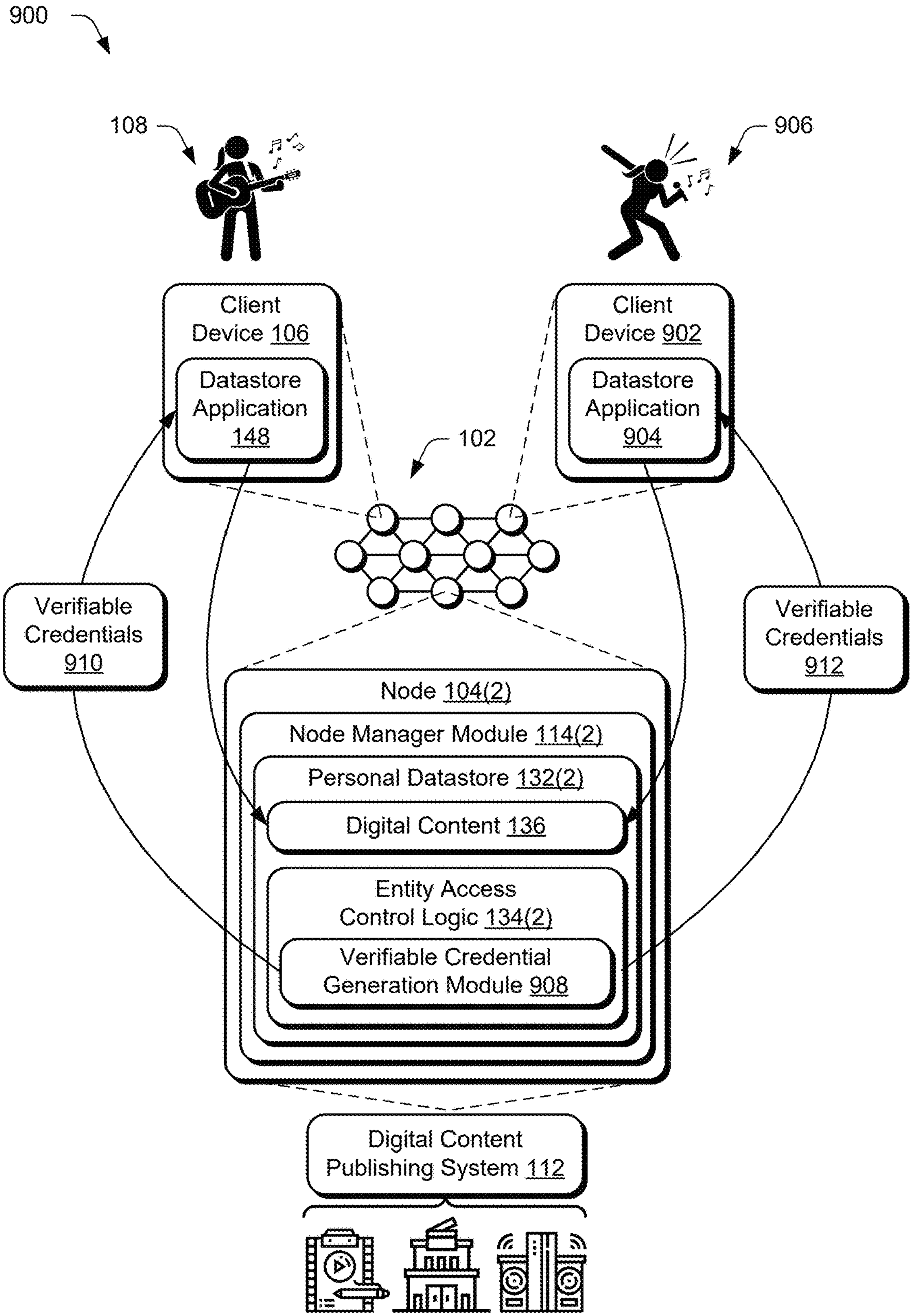
FIG. 9 is a non-limiting example showing operation of a personal datastore on a node of a decentralized platform as supporting collaboration between entities according to an implementation of the present subject matter.

FIG. 9 is a non-limiting example 900 showing operation of a personal datastore on a node of a decentralized platform as supporting collaboration between entities according to an implementation of the present subject matter. In this example 900, a system includes a client device 106 and associated datastore application 148 for an entity 108 as before, along with a node 104(2) associated with the digital content publishing system 112 as an example of a service provider system that supports digital services. This example also includes an additional client device 902 and an additional datastore application 904 associated with an additional entity 906.

The personal datastore 132(2) as previously described is configurable to maintain digital content 136. In this instance, the digital content 136 is created in collaboration by the entity 108 and the additional entity 906 e.g., as a guitarist and singer as illustrated. To support this, the digital content publishing system 112 includes a verifiable credential generation module 908 that acts as an issuer of verifiable credentials 910, 912 to the respective entities in support of those interactions.

Messages exchanged via the digital content publishing system 112, for instance, as part of collaboration between the entities in creation of the digital content 136 are validated using the verifiable credentials 910, 912. In this way, the verifiable credentials 910, 912 and decentralized identifiers of the entities are usable to validate "they are who they say they are" and use the verifiable credentials to verify access to the collaboration of the digital content 136. The verifiable credentials 910, 912 and data describing the associated interactions are then maintained by the personal datastore 132(2), in one or more examples, as part of the digital content 136. In this way, the verifiable credentials 910, 912 add trust to the resulting collaborative digital content created by the two entities.

Figure 10:
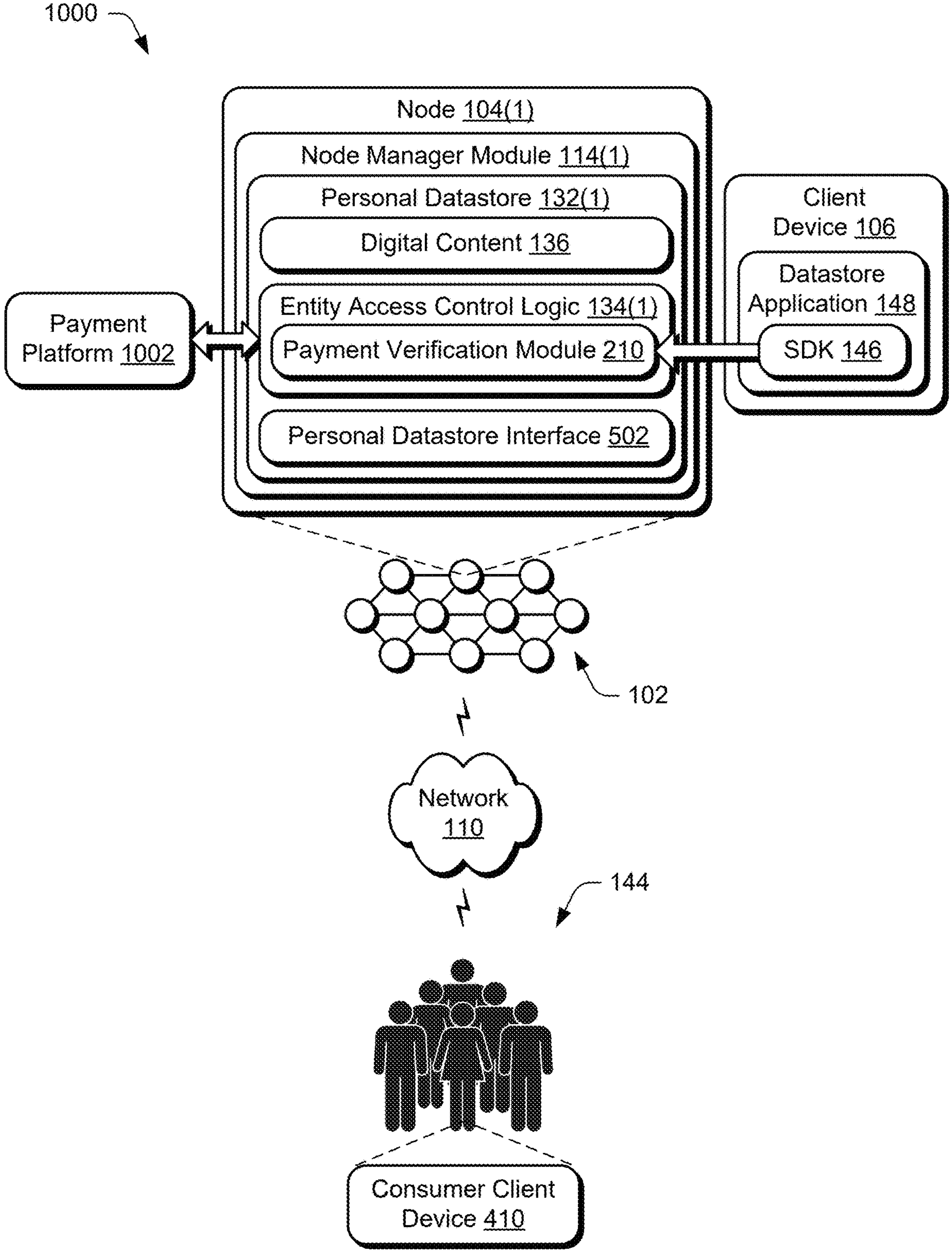
FIG. 10 is a non-limiting example showing operation of a personal datastore on a node of a decentralized platform as supporting a payment verification module according to an implementation of the present subject matter.

FIG. 10 is a non-limiting example 1000 showing operation of a personal datastore on a node of a decentralized platform as supporting a payment verification module 210 according to an implementation of the present subject matter. In this example, the SDK 146 is used by a datastore application 148 to support payment functionality as part of the personal datastore 132(1) through communication with a payment platform 1002. To do so, the payment verification module 210 is incorporated within a software stack of the personal datastore 132(1) using the SDK 146, which is configured to utilize application programming interfaces and application-programming hooks to support interaction of the personal datastore 132(1) with the payment platform 1002.

The payment verification module 210, for example, is configured to initiate collection of fees as part of controlling access to the digital content 136, e.g., through communication with a payment platform 1002 via the network 110. A decentralized identifier, for instance, is used to locate the personal datastore 132(1) of the artist by a consumer 144. A request is made to access the digital content 136 via the personal datastore, which includes the decentralized identifier of the consumer, and utilizes verifiable credentials as being "authorized" to access the digital content 136. Authorization to access the digital content 136 may be based on whether the entity 108 has a subscription to the digital content publishing system 112 (or other service), a tier of the subscription, a jurisdiction where the entity 108 is located, whether the entity 108 has an "access pass" for the digital content 136 (e.g., a non-fungible token), and so forth. Once the verifiable credentials and sufficient funds are determined as available using the decentralized identifier of the consumer 144, access is permitted which is controllable through subsequent use of additional verifiable credentials, e.g., to permit streaming from the personal datastore 132(1) for a period of time, etc.

Figure 11A:
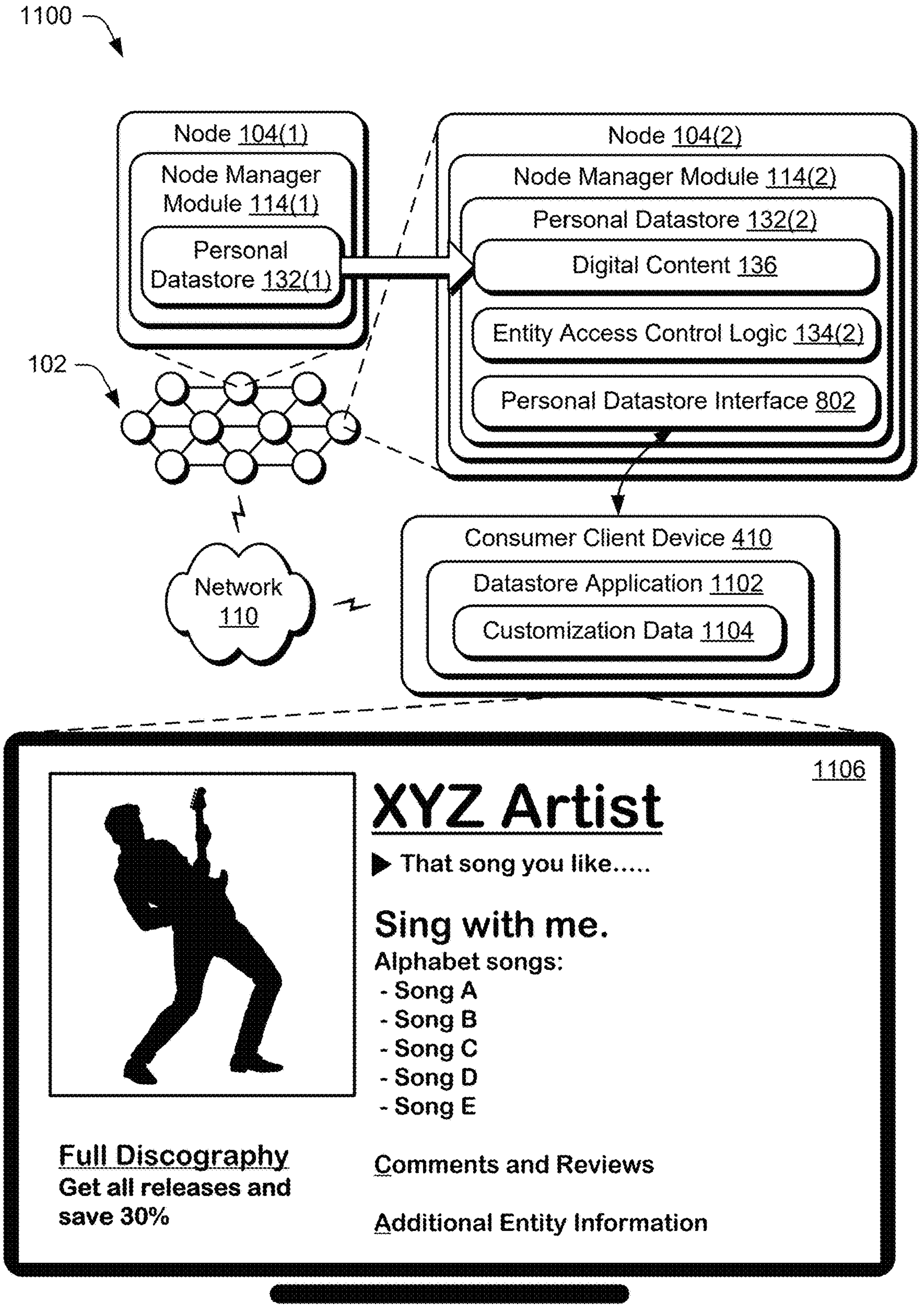
FIG. 11A is a non-limiting example showing customization of digital content by a consumer client device, the digital content received from a personal datastore according to an implementation of the present subject matter.

FIG. 11A is a non-limiting example 1100 showing customization of digital content by a consumer client device, the digital content received from a personal datastore according to an implementation of the present subject matter. The system in the example 1100 of FIG. 11 includes a node 104(1) having a personal datastore 132(1) associated with the entity 108 and node 104(2) associated with the digital content publishing system 112 as part of the decentralized platform 102. The consumer client device 410 is also included that is communicatively coupled via the network 110 to the decentralized platform 102. The consumer device 410 includes a datastore application 1102 which supports an ability to locate the personal datastore 132(2) and access digital content 136 via the personal datastore interface 802.

The entity 108 associated with the personal datastore 132(1) provides the digital content publishing system 112 with access to the personal datastore 132(1) via the decentralized platform 102, e.g., using a corresponding decentralized identifier and verifiable credential. The digital content publishing system 112 retrieves the digital content 136 via the personal datastore 132(1) (e.g., avatars, music, fan interactions, and so on) and stores the content in the personal data 132(2) maintained at node 104(2).

The digital content publishing system 112 is configurable to verify the digital content 136 by requesting proof of verifiable credentials associated with individual pieces of the digital content in the personal datastore 132(1) associated with the entity 108. The personal datastore 132(2), for instance, may leverage an additional set of backend verifiable credentials between the personal datastore 132(1) of the entity 108 and the personal datastore 132(2) of the digital content publishing system 112.

The personal datastore 132(2) is configurable to support a variety of additional functionalities, examples of which include compatibility with a variety of data formats, e.g., extensible markup language, JavaScript Object Notation. The personal datastore 132(2) is also configurable to support of a variety of types of payments including Bitcoin or other cryptocurrencies using a payment verification module 210 as described in FIG. 11, and so forth.

The digital content publishing system 112 may also generate associated content, e.g., an artist profile, album art, and so forth that is maintained as part of the digital content 136 for provision to the consumer client device 410. There is also an ability by the consumer client device 410 to control how the content is consumed through use of customization data 1104. The customization data 1104, for instance, is configurable to control customization of a user interface 1106.

The customization data 1104, for instance, may support layout customization that is usable to change a layout of elements in the user interface 1106, e.g., resizing, hiding different elements, and so forth. In another instance, themes and skins are supported including use of different color schemes, fonts, icons, and so forth. Accessibility settings are also supported to adjust font size, contrast, reader settings, and so on to accommodate visual, hearing, or other considerations. Widgets may also be included as part of the customization data 1104 to provide access to dynamic digital content in real time, e.g., as "live" content downloaded via a network 110. Behavior customization is also supported by the customization data 1104 to adjust how the datastore application 1102 executes, including use of default values, autocomplete, language and region settings, and so forth. Use of a machine-learning model is also supported to employ generative artificial intelligence (AI) to generate the user interface 1106, how the digital content 136 is rendered and output for display, and so forth. A variety of other examples are also contemplated.

Figure 11B:
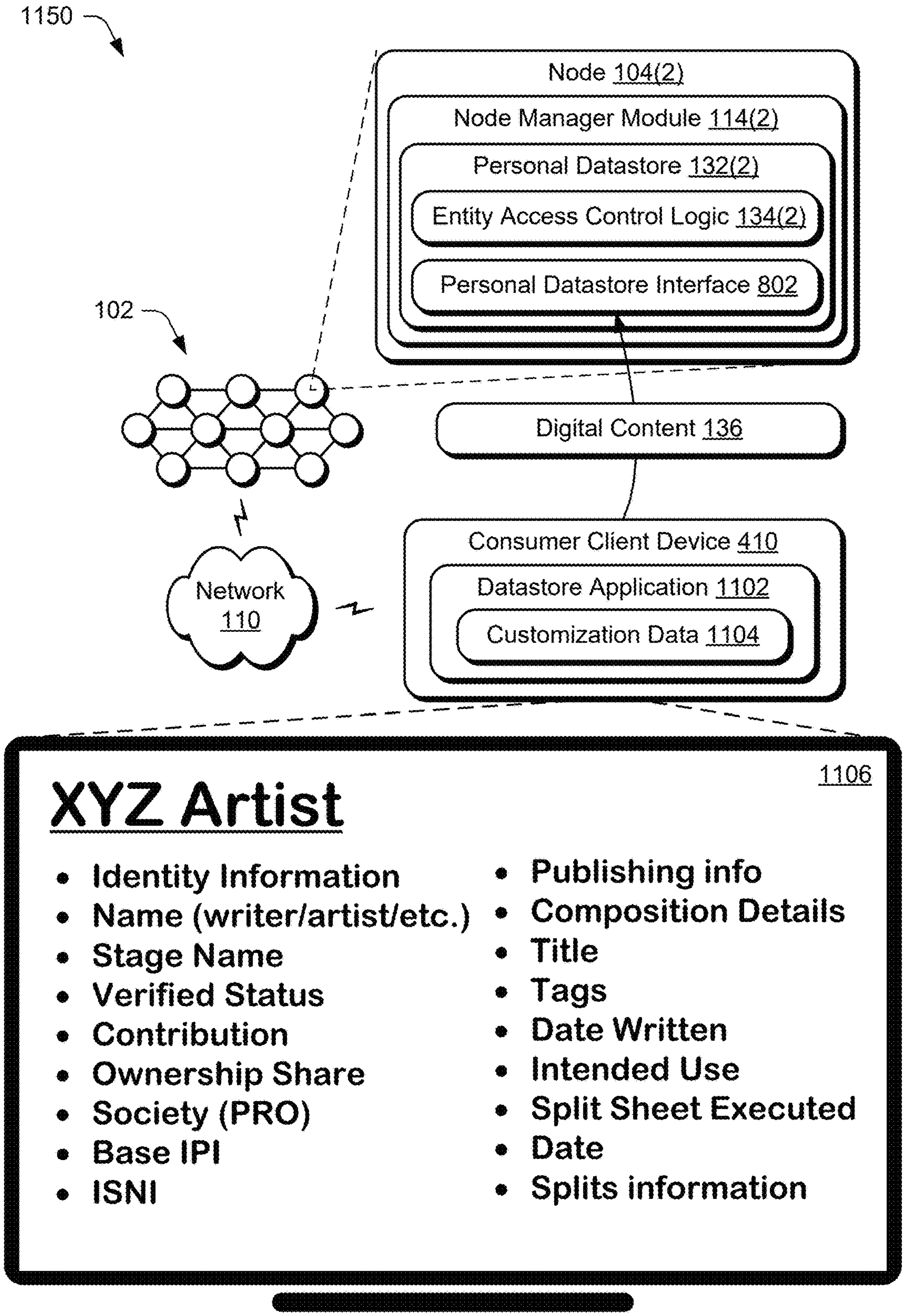
FIG. 11B is a non-limiting example showing customization of digital content by a consumer client device, the digital content received from the consumer client device 410.

FIG. 11B is a non-limiting example 1150 showing customization of digital content by a consumer client device, the digital content received from the consumer client device 410. The artist is this example, through interaction with the user interface 1106, is provided with an ability to connect identity to digital content 136 (e.g., songs) included in the personal datastore 132(2). Illustrated examples of information associated with the digital content 136 include, Identity Information, Name (writer/artist/etc.), Stage Name, Verified Status, Contribution, Ownership Share, Society (PRO), Base IPI, ISNI, Publishing info, Composition Details, Title, Tags, Date Written, Intended Use, Split Sheet Executed Date, and Splits information. A variety of other examples are also contemplated.

Figure 12:
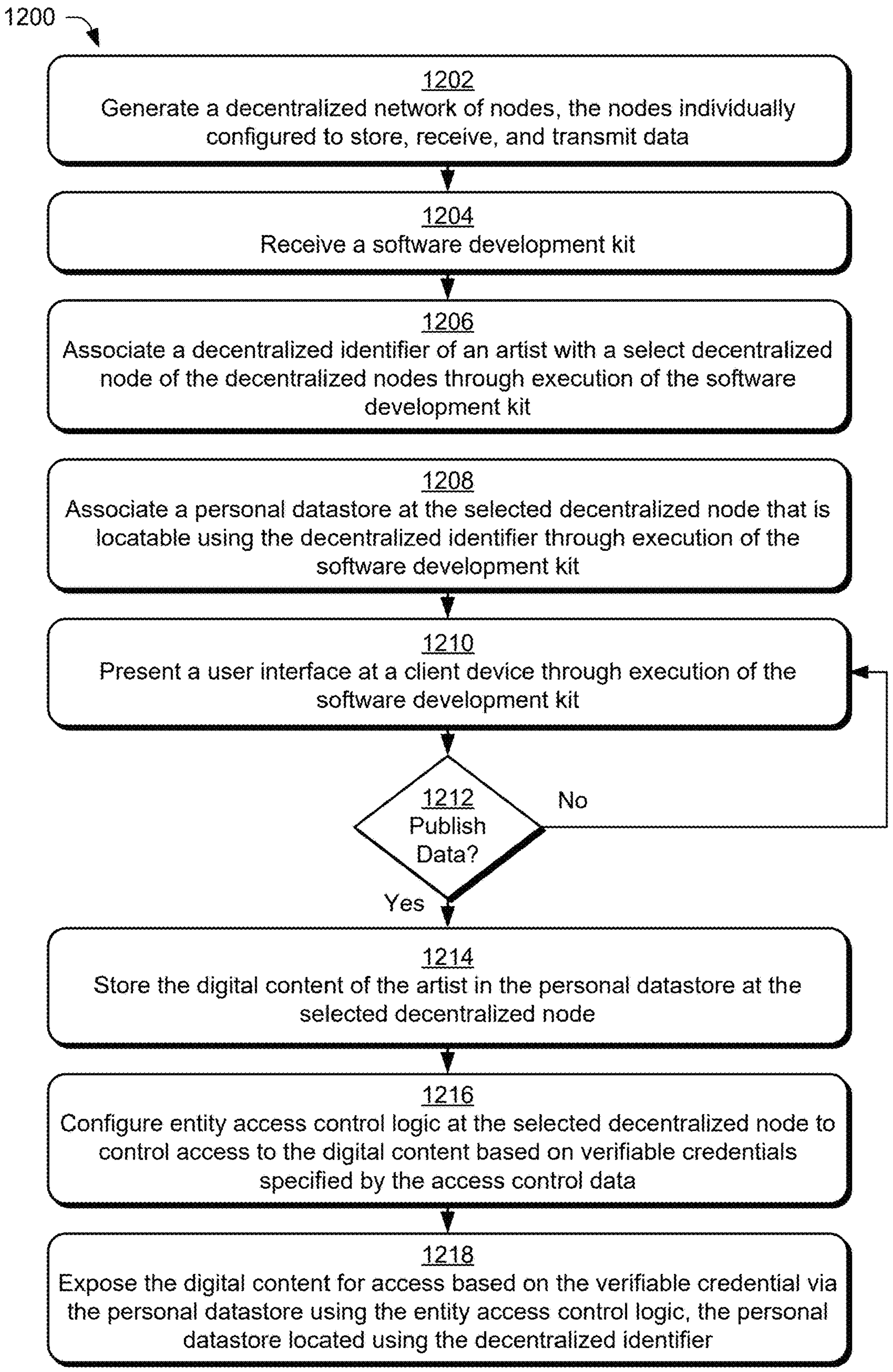
FIG. 12 is a flow diagram depicting a step-by-step procedure in an example implementation of operations performable by a processing device for accomplishing a result in which a personal datastore is associated with a decentralized node and configured to support access control logic to control access by consumers to digital content.

FIG. 12 is a flow diagram depicting a step-by-step procedure 1200 in an example implementation of operations performable by a processing device for accomplishing a result in which a personal datastore is associated with a decentralized node and configured to support access control logic to control access by consumers to digital content. The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11B.

To begin in this example, a network of decentralized nodes 104 is generated. The decentralized nodes are individually configured to store, receive, and transmit data (block 1202). Nodes 104, for instance, are configurable to form a decentralized platform 102 that supports data transfer using decentralized identifiers and verifiable credentials.

A software development kit is received (block 1204) that is executable to output a user interface, e.g., SDK 146. The user interface 212 is configured to specify digital content to be included in a personal datastore and access control data to specify verifiable credentials to control access to the digital content. A client device 106 associated with an entity 108, for instance, outputs a user interface 212 that is usable to specify digital content 136 as well as access controls 208 usable to control how the digital content 136 is to be accessed via a personal datastore.

A decentralized identifier of an artist is associated with a select decentralized node of the decentralized nodes through execution of the software development kit (block 1206). In an illustrated example of FIG. 1, for instance, a decentralized identifier 126 associated with the entity 108 is included through use of decentralized identifier document as part of decentralized identifier data 120 maintained by the decentralized platform 102. The decentralized identifier data 120 is then usable to "resolve" the decentralized identifier to a particular node of a plurality of nodes of the decentralized platform 102.

A personal datastore 132(1) is then associated at the selected decentralized node 104(1) that is locatable using the decentralized identifier through execution of the software development kit (block 1208), e.g., the SDK 146. The personal datastore 132(1), for instance, is referenced as part of personal datastore identifier data 406 that is then also resolvable using the DID resolver module 404 using a corresponding decentralized identifier.

The user interface 212 is presented at the client device 106 through execution of the software development kit (block 1210), e.g., the SDK 146. The user interface 212 includes options to upload personal datastore data 140 to the personal datastore 132 as shown in FIG. 3. The personal datastore data 140 includes the digital content 136 of the artist and access control data 142 specifying verifiable credentials.

A determination is made as to whether an option is selected to publish digital content (block 1212), e.g., as output by the permission control and publish module 312 to make the personal datastore data 140 publicly available. If not ("no" from decision block 1212), the user interface 212 remains (block 1210) and the personal datastore data 140 is not made publicly available.

If so ("yes" from decision block 1212), the digital content 136 of the artist is stored in the personal datastore 132(1) at the selected decentralized node 104(1) (block 1214). Entity access control logic 134(1) is also configured at the selected decentralized node to control access to the digital content 136 based on verifiable credentials specified by the access control data 142 (block 1216). The entity access control logic 134(1), for instance, is usable to restrict access based on decentralized identifiers and/or verifiable credentials.

The digital content 136 is then exposed for access based on the verifiable credential via the personal datastore using the entity access control logic 134(1) (block 1218) in response to selection of the publish option. The personal datastore 132(1) is locatable using the decentralized identifier 126 associated with the entity 108.

Figure 13:
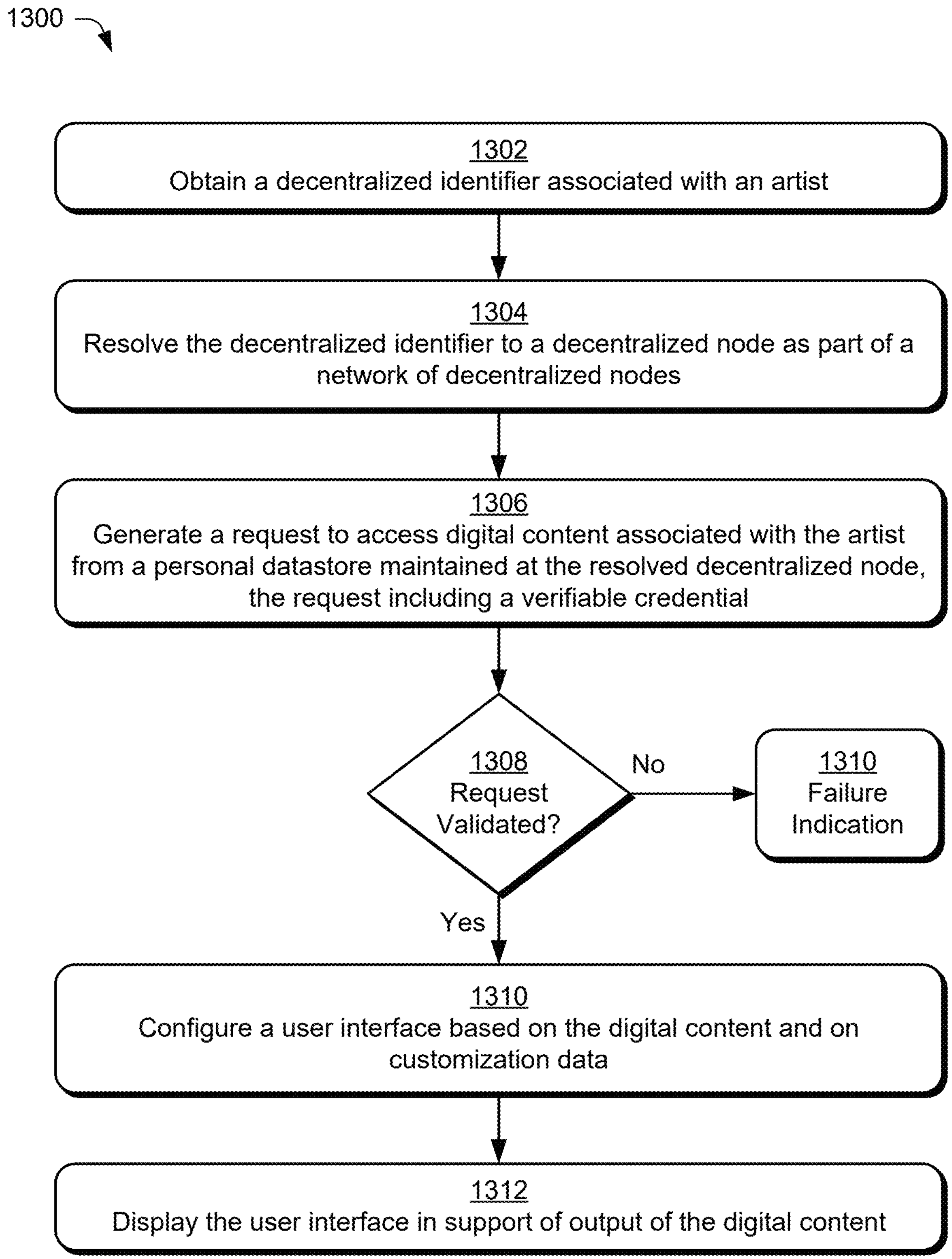
FIG. 13 is a flow diagram depicting a step-by-step procedure in an example implementation of operations performable by a processing device for accomplishing a result in which a personal datastore is located and digital content customized based on customization data.

FIG. 13 is a flow diagram depicting a step-by-step procedure 1300 in an example implementation of operations performable by a processing device for accomplishing a result in which a personal datastore is located and digital content customized based on customization data. A decentralized identifier is obtained that is associated with an artist (block 1302). A datastore application 1102, for instance, is executed by a consumer client device 410. The datastore application 1102 obtains the decentralized identifier 126 in a variety of ways, e.g., scans a QR code, entered manually in a user interface, and so forth.

The decentralized identifier is resolved to a decentralized node as part of a network of decentralized nodes (block 1304). The consumer client device 410, for instance, communicates with a DID resolver module 404 maintained at a node 104(3). The DID resolver module 404 resolves the decentralized identifier 126 using the personal datastore identifier data 406 to locate a particular node 104(1), at which, the personal datastore 132(1) is located that is associated with the decentralized identifier.

A request is generated to access digital content 136 associated with the artist from a personal datastore 132(1) maintained at the resolved decentralized node 104(1). The request includes a verifiable credential (block 1306). The verifiable credential, for instance, is usable to attest to purchase of the digital content 136, membership in a fan club, employee of a business entity, and so forth.

A determination is then made as to whether the request is validated (decision block 1308). A cryptographic proof of the verifiable credential, for instance, is checked with a credential issuer system to determine validity of the credential, and thus the attestation made by the credential. If the request is not validated ("no" from decision block 1308), a failure indication is received (block 1310).

If the request is validated ("yes" from decision block 1310), a user interface 1106 is configured based on the digital content 136 and the customization data 1104(block 1310). The user interface 1106, for instance, is customized for a layout, fonts, icons, behaviors, through use of generative artificial intelligence, and so forth. The user interface 1106 is displayed in support of output of the digital content 136 (block 1312), e.g., as rendered for display by a display device of the consumer client device 410. A variety of other examples are also contemplated.

Figure 14:
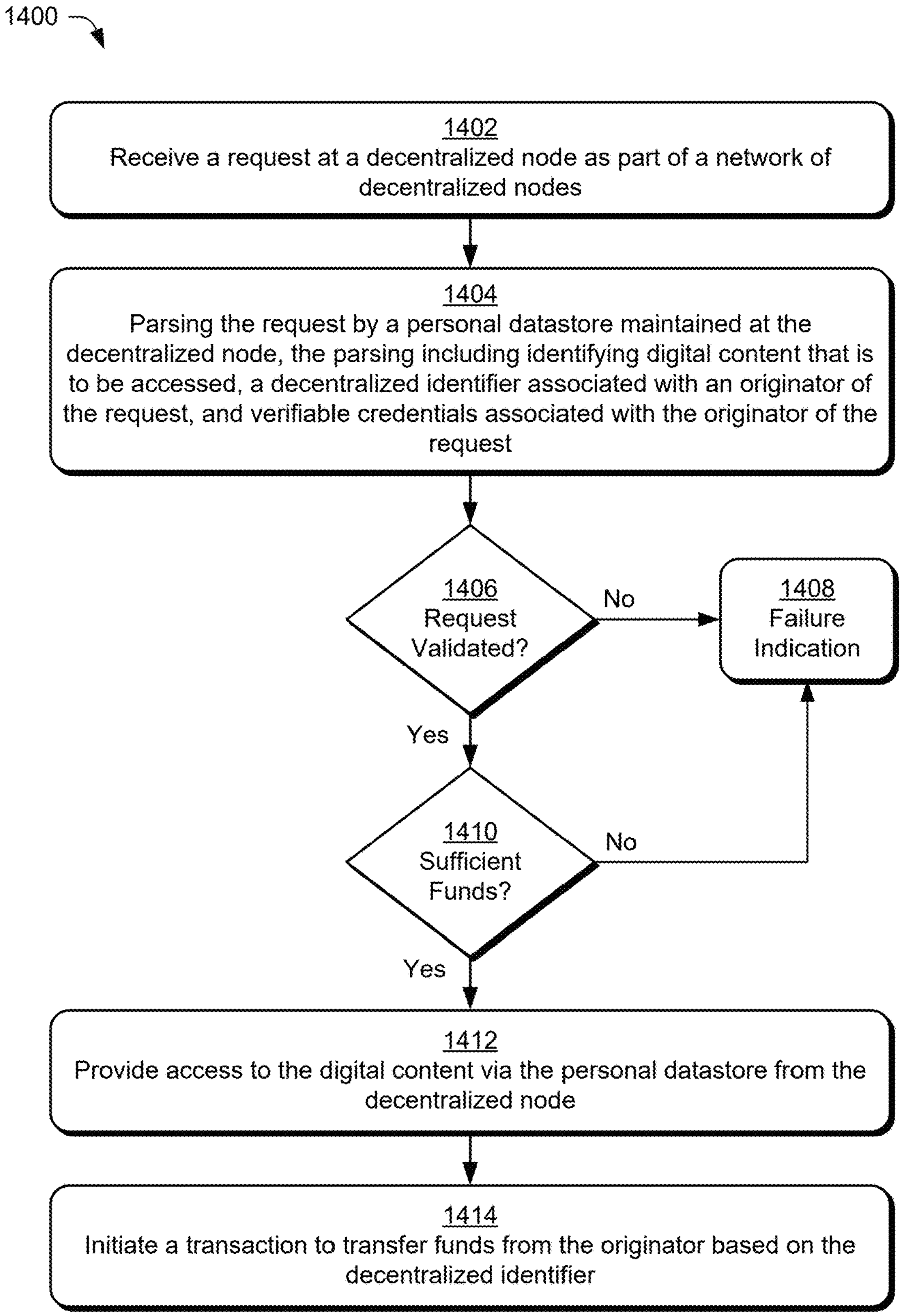
FIG. 14 is a flow diagram depicting a step-by-step procedure in an example implementation of operations performable by a processing device for accomplishing a result in which a request is validated and a determination is made of sufficient funds as part of controlling access to digital content at a personal datastore.

FIG. 14 is a flow diagram depicting a step-by-step procedure 1400 in an example implementation of operations performable by a processing device for accomplishing a result in which a request is validated and a determination is made of sufficient funds as part of controlling access to digital content at a personal datastore. In the illustrated example, a request is received at a decentralized node as part of a network of decentralized nodes (block 1402) as described in the above examples.

The request is parsed by a personal datastore 132(1) maintained at the decentralized node 104(1) (block 1404), e.g., associated with an entity 108. The request, for instance, is originated at a consumer client device 410 associated with one or more consumers 144 and communicated via the network 110. The consumer client device 410, for example, locates the personal datastore 132(1) using a decentralized identifier. Parsing of the request includes identifying digital content 136 that is to be accessed, a decentralized identifier associated with an originator of the request (e.g., the one or more consumers 144), and verifiable credentials associated with the originator of the request.

A determination is made as to whether the request is valid (decision block 1406). The personal datastore 132(1), for instance, communicates with a credential issuer system to determine validity of a cryptographic proof included as part of the verifiable credential. In response to a determination that the request is not valid ("no" from decision block 1406), a failure indication is output (block 1408) by the personal datastore 132(1) for communication back to the consumer client device 410.

In response to a determination that the request is valid ("yes" from decision block 1406), a determination is made by the personal datastore 132(1) as to whether there are sufficient funds available (decision block 1410). The personal datastore 132(1), for instance, utilizes a decentralized identifier associated with the originator of the request (e.g., the one or more consumers 144) to query a payment platform 1002 as to whether there are sufficient funds available for the originator. If not ("no" from decision block 1410), a failure indication is output (block 1408) for communication back to the consumer client device 410 as before.

If so ("yes" from decision block 1410), access to the digital content is provided via the personal datastore from the decentralized node (block 1412) and a transaction is initiated to transfer funds from an originator of the request based on the decentralized identifier (block 1414). The personal datastore 132(1), for instance, initiates the transfer of the funds, and once completed, access to the digital content 136 is granted to the consumer client device 410. The personal datastore 132(1), for instance, may initiate streaming of the digital content 136 via the network 110, provide the digital content 136 as available for download, and so forth. A variety of other examples are also contemplated.

Figure 15:
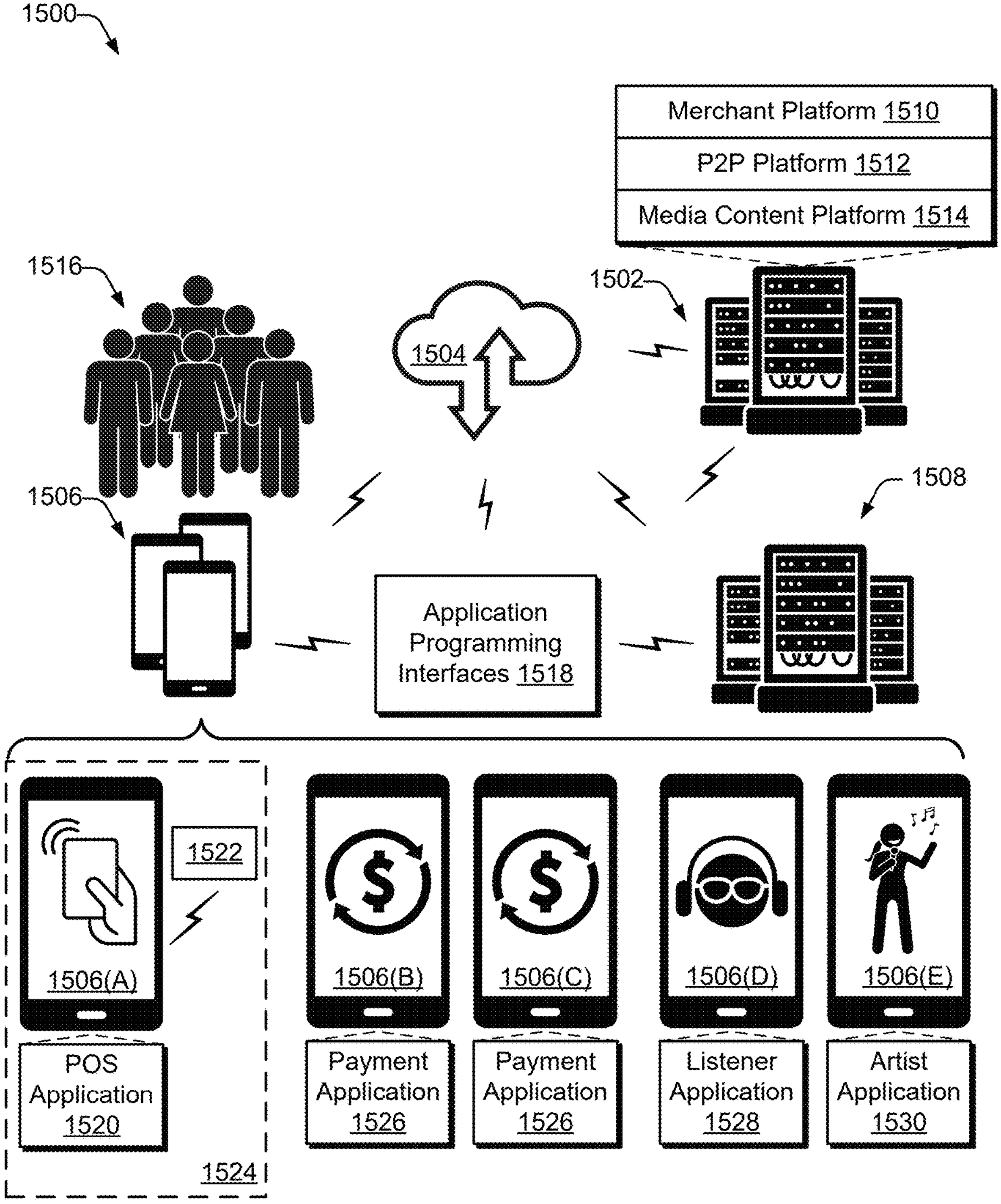
FIG. 15 is a non-limiting example illustrating an environment in which recommendation techniques described herein are performed in accordance with one or more implementations.

FIG. 15 illustrates an example environment 1500 in which recommendation techniques described herein are performed in accordance with one or more implementations. The environment 1500 includes server(s) 1502 that can communicate over a network 1504 with end user devices 1506 and/or server(s) 1508 associated with third-party service provider(s). In various examples, the end user devices 1506 may comprise one or more seller devices 1506(A), one or more user devices 1506(B) and/or 1506(C) in a peer network, one or more content consumption devices 1506(D), one or more artist devices 1506(E), combinations of these examples, or other categories of user devices. The server(s) 1502 can be associated with one or more service providers that can provide one or more services for the benefit of users 1516, as described below. For example, the server(s) 1502 may enable services of service providers such as in association with a seller platform 1510 (which may further include a buyer platform), a peer-to-peer (P2P) payment platform 1512, a media content platform 1514, a combination of these platforms, or other platforms associated with other service providers. While services and features are referenced throughout in connection with a particular one of the seller platform 1510, the P2P payment platform 1512, or the media content platform 1514, it should be understood that any of these platforms may perform the functionality described in relation to any of the other platforms. Actions attributed to the service provider(s) can be performed by the server(s) 1502. The service provider(s), for instance, are configurable to implement a variety of digital services as described above.

In some examples, individual ones of the end user devices 1506 can be operable by users 1516, e.g., which corresponding to the entity 108 and the client device 106. The users 1516 (individually referred to herein as "user 1516") can be referred to as customers, buyers, merchants, sellers, borrowers, employees, employers, payors, payees, couriers, artists, musicians, listeners, fans, supervisors, hosts, audience members, and so on. The users 1516 can interact with the end user devices 1506 via user interfaces presented via the end user devices 1506. In at least one example, a user interface can be presented via a web browser, or the like. Alternatively or additionally, a user interface can be presented via an application, such as a mobile application or desktop application, which can be provided by the seller platform 1510, the P2P payment platform 1512, and/or the media content platform 1514, or which can be an otherwise dedicated application. In some examples, individual end user devices 1506 can have an instance or versioned instance of an application, which can be downloaded from an application store, for example, which can present the user interface(s) described herein.

In at least one example, the users 1516 can include merchants that can operate the seller device(s) 1506(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1506(A) can have an instance of a point of sale ("POS") application 1520 stored thereon. The POS application 1520 can configure the seller device 1506(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1520 can determine transaction data associated with the POS transactions. Transaction data can include payment information, which can be obtained from a reader device 1522 associated with the seller device 1506(A), user authentication data, purchase amount information, point-of-purchase information (e.g., item(s) purchased, date of purchase, time of purchase, subscription type, etc.), etc. The POS application 1520 can send transaction data to the server(s) 1502 such that the server(s) 1502 can track transactions of the customers, merchants, and/or the users 1516 over time. Furthermore, the POS application 1520 can present a UI to enable the merchant to interact with the POS application 1520 and/or the seller platform 1510 via the POS application 1520.

In at least one example, the seller device 1506(A) can be a special-purpose computing device configured as a POS terminal (via the execution of the POS application 1520). In at least one example, the POS terminal may be connected to a reader device 1522, which is capable of accepting a variety of payment instruments, such as credit cards, debit cards, gift cards, short-range communication based payment instruments, and the like, as described below. In at least one example, the reader device 1522 can plug in to a port in the seller device 1506(A), such as a microphone port, a headphone port, an audio-jack, a data port, or other suitable port. In additional or alternative examples, the reader device 1522 can be coupled to the seller device 1506(A) via another wired or wireless connection, such as via Bluetooth®, BLE, and so on. In some examples, the reader device 1522 can be a software solution executing on the POS terminal, e.g., a mobile phone. In some examples, the reader device 1522 can read information from alternative payment instruments including, but not limited to, wristbands and the like.

In some examples, the reader device 1522 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1522, and communicate with the seller platform 1510, which can provide, among other services, a payment processing service. The server(s) 1502 associated with the seller platform 1510 can communicate with server(s) 1508, as described below. In this manner, the POS terminal and reader device 1522 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1522 of the POS system 1524 are shown as separate devices, in additional or alternative examples, the POS terminal and the reader device 1522 can be part of a single device. In some examples, the reader device 1522 can have a display integrated therein for presenting information to customers of a merchant. In additional or alternative examples, the POS terminal can have a display integrated therein for presenting information to the customers of the merchant. POS systems, such as the POS system 1524, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1522, whereby the reader device 1522 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1524, the server(s) 1502, and/or the server(s) 1508 may exchange payment information and transaction data to determine whether transactions are authorized. For example, the POS system 1524 may provide encrypted payment data, user authentication data, purchase amount information, point-of-purchase information, etc. (collectively, transaction data) to server(s) 1502 over the network(s) 1504. The server(s) 1502 may send the transaction data to the server(s) 1508.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 1508 associated therewith) can forward the fund transfer request to an issuing bank (e.g., "issuer"). The issuer is a bank or financial institution that offers a financial account (e.g., credit or debit card account) to a user. The issuer (e.g., the server(s) 1508 associated therewith) can make a determination as to whether the customer has the capacity to absorb the relevant charge associated with the payment transaction. In at least one example, the seller platform 1510 can serve as an issuer and/or can partner with an issuer. The transaction is either approved or rejected by the issuer and/or the card payment network (e.g., the server(s) 1508 associated therewith), and a payment authorization message is communicated from the issuer to the POS device via a path opposite of that described above, or via an alternate path.

The server(s) 1508 may send an authorization notification over the network(s) 1504 to the server(s) 1502, which may send the authorization notification to the POS system 1524 over the network(s) 1504 to indicate whether the transaction is authorized. The server(s) 1502 may also transmit additional information such as transaction identifiers to the POS system 1524. In one example, the server(s) 1502 may include a merchant application and/or other functional components for communicating with the POS system 1524 and/or the server(s) 1508 to authorize or decline transactions (e.g., the API 1518). In examples, the seller platform 1510 can enable the merchants to receive cash payments, payment card payments, and/or electronic payments from customers for POS transactions and the service provider can process transactions on behalf of the merchants.

Based on the authentication notification that is received by the POS system 1524 from server(s) 1502, the merchant may indicate to the customer whether the transaction has been approved. In some examples, approval may be indicated at the POS system 1524, for example, at a display of the POS system 1524. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The seller platform 1510 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the user devices 1506 can access all of the services. In some cases, the user devices 1506 can have gradated access to the services, which can be based on risk tolerance, IDV outputs, subscriptions, and so on. In at least one example, access to such services can be availed to the merchants via the POS application 1520. In additional or alternative examples, each service can be associated with its own access point (e.g., application, web browser, etc.).

As the seller platform 1510 processes transactions on behalf of the merchants, the seller platform 1510 can maintain accounts or balances for the merchants in one or more ledgers. For example, the seller platform 1510 can analyze transaction data received for a transaction to determine an amount of funds owed to a merchant for the transaction and deposit funds into an account of the merchant. The account can have a stored balance, which can be managed by the seller platform 1510. The account can be different from a conventional bank account at least because the stored balance is managed by a ledger of the seller platform 1510 and the associated funds are accessible via various withdrawal channels including, but not limited to, scheduled deposit, same-day deposit, instant deposit, and a linked payment instrument.

A scheduled deposit can occur when the seller platform 1510 transfers funds associated with a stored balance of the merchant to a bank account of the merchant that is held at a bank or other financial institution (e.g., associated with the server(s) 1508). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the seller platform 1510 to the bank account of the merchant.

In at least one example, the seller platform 1510 may provide inventory management services. That is, the seller platform 1510 may provide inventory tracking and reporting. Inventory management services may enable the merchant to access and manage a database storing data associated with a quantity of each item that the merchant has available (i.e., an inventory). Furthermore, in at least one example, the seller platform 1510 can provide catalog management services to enable the merchant to maintain a catalog, which can be a database storing data associated with items that the merchant has available for acquisition (i.e., catalog management services). The seller platform 1510 can offer recommendations related to pricing of the items, placement of items on the catalog, and multi-party fulfillment of the inventory, to name a few examples.

In at least one example, the seller platform 1510 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the seller platform 1510 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the seller platform 1510 can provide financing services for offering and/or lending a loan to a borrower that is to be used for, in some instances, financing the borrower's short-term operational needs (e.g., a capital loan). Additionally or alternatively, the seller platform 1510 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The seller platform 1510 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The seller platform 1510 can provide web-development services, which enable users 1516 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the seller platform 1510 can recommend and/or generate content items to supplement omni-channel presences of the merchants.

Furthermore, the seller platform 1510 can provide payroll services to enable employers to pay employees for work performed on behalf of employers. In at least one example, the seller platform 1510 can receive data that includes time worked by an employee (e.g., through imported timecards and/or POS interactions), sales made by the employee, gratuities received by the employee, and so forth. Based on such data, the seller platform 1510 can make payroll payments to employee(s) on behalf of an employer via the payroll service. For instance, the seller platform 1510 can facilitate the transfer of a total amount to be paid out for the payroll of an employee from the bank of the employer to the bank of the seller platform 1510 to be used to make payroll payments. In at least one example, when the funds have been received at the bank of the seller platform 1510, the seller platform 1510 can pay the employee, such as by check or direct deposit.

Moreover, in at least one example, the seller platform 1510 can provide employee management services for managing schedules of employees. Further, the seller platform 1510 can provide appointment services for enabling users 1516 to set schedules for scheduling appointments and/or users 1516 to schedule appointments.

In some examples, the seller platform 1510 can provide restaurant management services to enable users 1516 to make and/or manage reservations, to monitor front-of-house and/or back-of-house operations, and so on. In such examples, the seller device(s) 1506(A) and/or server(s) 1502 can be configured to communicate with one or more other computing devices, which can be located in the front-of-house (e.g., POS device(s)) and/or back-of-house (e.g., kitchen display system(s) (KDS)). In at least one example, the seller platform 1510 can provide order management services and/or fulfillment services to enable restaurants (or other merchant types) to manage open tickets, split tickets, and so on and/or manage fulfillment services.

In some examples, the seller platform 1510 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the seller platform 1510 can leverage other merchants and/or sales channels that are part of the seller platform 1510 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the seller platform 1510 can enable conversational commerce via conversational commerce services, which can use one or more machine learning mechanisms to analyze messages exchanged between two or more users 1516, voice inputs into a virtual assistant or the like, to determine intents of user(s) 1516. In some examples, the seller platform 1510 can utilize determined intents to automate customer service, offer promotions, provide recommendations, or otherwise interact with customers in real-time. In at least one example, the seller platform 1510 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1516 may be new to the seller platform 1510 such that the user 1516 that has not registered (e.g., subscribed to receive access to one or more services offered by the seller platform 1510) with the seller platform 1510. The seller platform 1510 can offer onboarding services for registering a potential user 1516 with the seller platform 1510. In some examples, onboarding can involve presenting various questions, prompts, and the like to a potential user 1516 to obtain information that can be used to generate a profile for the potential user 1516. In at least one example, the seller platform 1510 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the seller platform 1510 can be transitioned to more permissive (e.g., less limited) or longer-term access to such services.

The seller platform 1510 can be associated with IDV services, which can be used by the seller platform 1510 for compliance purposes and/or can be offered as a service, for instance to third-party service providers (e.g., associated with the server(s) 1508). That is, the seller platform 1510 can offer IDV services to verify the identity of users 1516 seeking to use or using their services. Identity verification may involve requesting a customer (or potential customer) to provide information that is used by compliance departments to prove that the information is associated with an identity of a real person or entity (e.g., an artist). In at least one example, the seller platform 1510 can perform services for determining whether identifying information provided by a user 1516 accurately identifies the customer (or potential customer).

Techniques described herein can be configured to operate in both real-time/online and offline modes. "Online" modes refer to modes when devices are capable of communicating with the seller platform 1510 while offline mode refers to modes when devices are unable to communicate with the server(s) 1508 due to network connectivity issue, for example. In such examples, devices may operate in "offline" mode where at least some payment data is stored (e.g., on the seller device(s) 1506(A)) and/or the server(s) 1502 until connectivity is restored and the payment data can be transmitted to the server(s) 1502 and/or the server(s) 1508 for processing.

In at least one example, the seller platform 1510 can be associated with a hub, such as an order hub, an inventory hub, a fulfillment hub and so on, which can enable integration with one or more additional service providers (e.g., associated with the additional server(s) 1508). In some examples, such additional service providers can offer additional or alternative services and the service provider can provide an interface or other computer-readable instructions to integrate functionality of the service provider into the one or more additional service providers.

Turning now to the P2P functionality provided by the environment 1500, the P2P platform 1512 can provide a peer-to-peer payment service that enables peer-to-peer payments between two or more of the users 1516. Two or more of the users 1516 may be considered "peers" in a peer-to-peer interaction, such as a payment. In at least one example, the P2P platform 1512 can communicate with instances of a payment application 1526 (or other access point) installed on end user devices 1506 configured for operation by the users 1516. In an example, an instance of the payment application 1526 executing on a first user device 1506(B) operated by a payor (e.g., one of the users 1516) can send a request to the P2P platform 1512 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1516) via a peer-to-peer payment. In some examples, assets associated with an account of the payor are transferred to an account of the payee. In some examples, assets can be held at least temporarily in an account of the P2P platform 1512 prior to transferring the assets to the account of the payee.

Figure 16:
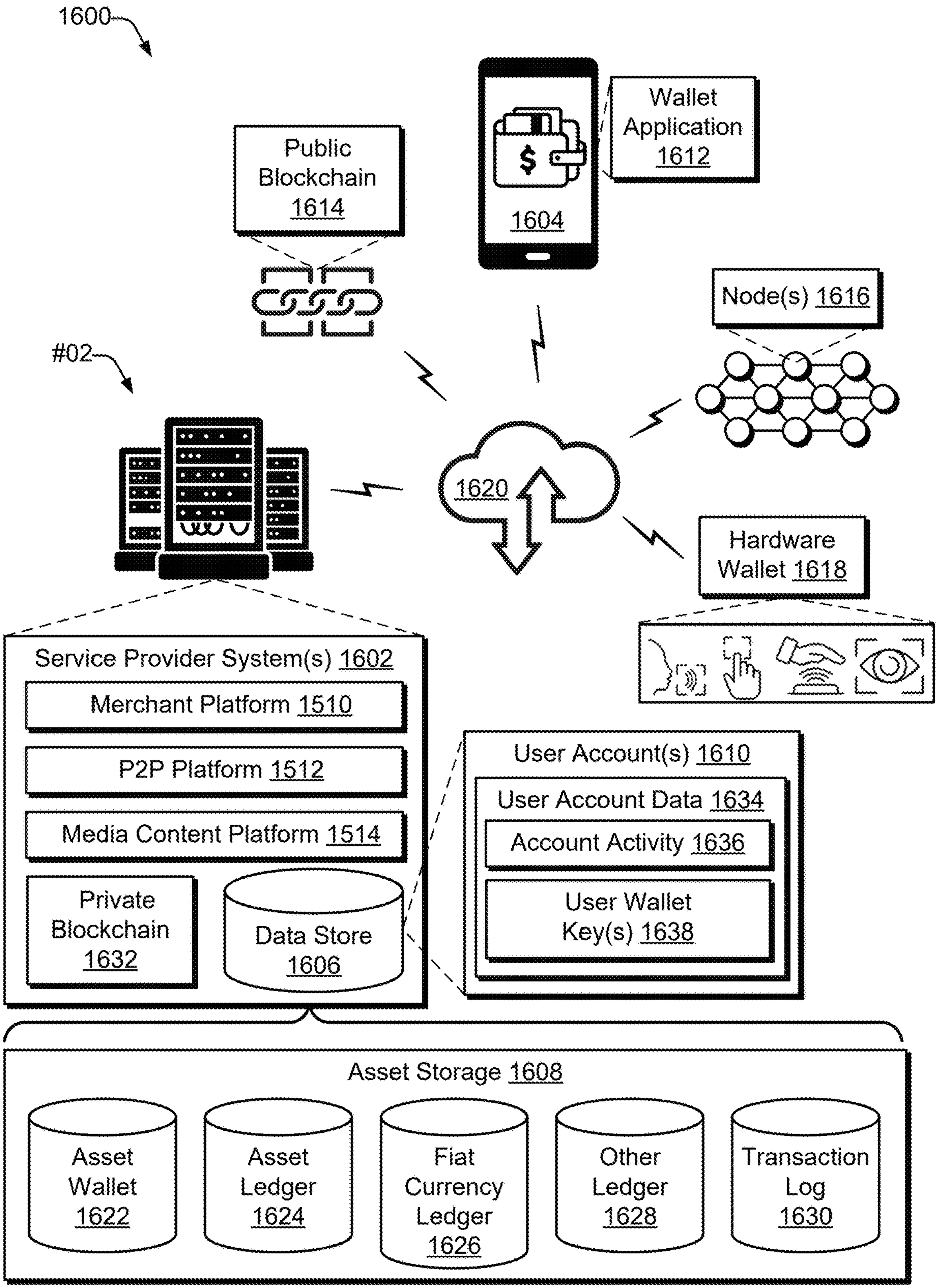
FIG. 16 is a non-limiting example illustrating an environment in which recommendation techniques described herein are performed in accordance with one or more implementations.

In some examples, the P2P platform 1512 can utilize a ledger system to track transfers of assets between users 1516. FIG. 16, below, provides additional details associated with such a ledger system. The ledger system can enable users 1516 to own fractional shares of assets that are not conventionally available. For instance, a user can own a fraction of a Bitcoin, an NFT, or a stock. Additional details are described herein.

In at least one example, the P2P platform 1512 can facilitate transfers and can send notifications related thereto to instances of the payment application 1526 executing on user device(s) of payee(s). As an example, the P2P platform 1512 can transfer assets from an account of a first user to an account of a second user and can send a notification to the user device 1506(B) of the second user for presentation via a user interface. The notification can indicate that a transfer is in process, a transfer is complete, or the like. In some examples, the P2P platform 1512 can send additional or alternative information to the instances of the payment application 1526 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1512 funds the request to payee on behalf of the payor, to speed up the transfer process and compensate for lags that may be attributed to the payor's financial network.

In some examples, the P2P platform 1512 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1502 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1526 executing on the end user devices 1506. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1512 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 15 or a third-party service provider associated with the server(s) 1508. In examples where the content provider is a third-party service provider, the server(s) 1508 can be accessible via one or more APIs 1518 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1512 (e.g., the P2P platform 1512 offers a chat or messaging service that is within the payment application or accessible via the payment application). In some examples, the messaging application can be external to the P2P platform 1512. (e.g., the messaging application is hosted by a third-party service provider associated with the server(s) 1508, which can be accessible via one or more of the APIs 1518 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1512 can enable users 1516 to perform banking transactions via instances of the payment application 1526. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1512 can enable users to allocate funds between different accounts, sub-accounts, or balances (e.g., spending, saving, different assets, different currencies), etc. Further, users 1516 can configure bill pay, recurring payments, and/or the like using assets associated with their accounts. In some examples, the P2P platform 1512, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1512 enables users to buy and/or sell assets via asset networks such as cryptocurrency networks, securities networks, and/or the like. In some examples, acquisition of such assets can be in whole or fractional shares. The ledger system described below with reference to FIG. 16 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1512 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1512 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1512 can automatically apply the amount of funds associated with the gift card to the transaction.

In some examples, users can configure their account such that when they use their payment instruments, the P2P platform 1512 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1512 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1512 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 1512 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1512.

In some examples, components of the environment 1500 may be integrated to enable payments at the point-of-sale using assets associated with user accounts of the P2P platform 1512. As illustrated in the environment 1500, the components can communicate with one another via the network 1504, where one or more APIs 1518 or other functional components can be used to facilitate such communication.

In at least one example, an integration can enable a customer to participate in a transaction via their own computing device (e.g., user device 1506(B)) instead of interacting with a merchant device of a merchant, such as the seller device 1506(A). In such an example, the POS application 1520, associated with a payment processing platform and executable by the seller device 1506(A) of the merchant, can present a Quick Response (QR) code, or other code that can be used to identify a transaction (e.g., a transaction code), in association with a transaction between the customer and the merchant. The QR code, or other transaction code, can be provided to the POS application 1520 via an API 1518 associated with the peer-to-peer payment platform. In an example, the customer can utilize their own computing device, such as the user device 1506(B), to capture the QR code, or the other transaction code, and to provide an indication of the captured QR code, or other transaction code, to server(s) 1502.

Based at least in part on the integration of the peer-to-peer payment platform and the payment processing platform (e.g., via the API 1518), the server(s) 1502 of the seller platform 1510 can exchange communications with a payment application 1526 associated with the P2P platform 1512 and/or the POS application 1520 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1512 and seller platform 1510 (which can be a first- or third-party integration) such that a QR code, or other transaction code, specific to the transaction can be used for providing transaction details, location details, customer details, or the like to a computing device of the customer, such as the user device 1506(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1506(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1520 and the payment application 1526, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1506(B), can be specially configured as a buyer-facing device having functionality similar to the functionality described above in the brick-and-mortar example.

In some examples, based at least in part on capturing the QR code, or other transaction code, the seller platform 1510 can provide transaction data to the P2P platform 1512 for presentation via the payment application 1526 on the computing device of the customer, such as the user device 1506B (B), to enable the customer to complete the transaction via their own computing device. In some examples, in response to receiving an indication that the QR code, or other transaction code, has been captured or otherwise interacted with via the customer computing device, the P2P platform 1512 can determine that the customer authorizes payment of the transaction using funds associated with a stored balance of the customer that is managed and/or maintained by the P2P platform 1512. Such authorization can be implicit such that the interaction with the transaction code can imply authorization of the customer. Alternatively or additionally, the P2P platform 1512 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 1512 can transfer funds from the stored balance of the customer to the seller platform 1510. In at least one example, the seller platform 1510 can deposit the funds, or a portion thereof, into a stored balance of the merchant that is managed and/or maintained by the seller platform 1510. In such an example, the seller platform 1510 can be a "peer" to the customer in a peer-to-peer transaction.

In some examples, techniques described herein can enable the customer to interact with the transaction after payment for the transaction has been settled. For example, in at least one example, the seller platform 1510 can cause a total amount of a transaction to be presented via a user interface associated with the payment application 1526 such that the customer can provide gratuity, feedback, loyalty information, or the like, via an interaction with the user interface. In another example, the seller platform 1510 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1512, if the customer inputs a tip and/or an event affecting the total amount of the transaction is triggered, the P2P platform 1512 can transfer additional funds, associated with the tip or event, to the seller platform 1510. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1526 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1512 as described herein (e.g., a debit card linked to a stored balance of a customer) such that when the payment instrument is caused to interact with a payment reader, the seller platform 1510 can exchange communications with the P2P platform 1512 to authorize payment for a transaction and/or provision associated transaction data to a computing device of the customer associated with the transaction.

Turning now to media content functionality provided by the environment 1500, the media content platform 1514 can provide digital media to a content consumption device 1506(D) where playback may occur using “streaming.” In examples, “streaming” media content involves encoding the media content and transmitting the encoded media content over the network 1504 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1514 can provide a digital media streaming service (e.g., subscription-based, non-subscription-based) that enables a content consumption device 1506(D) to stream and/or download digital media content via a listener application 1528 installed on the content consumption device 1506(D). For instance, the media content platform 1514 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1506(D), the listener application 1528 may verify access rights to the digital media content items at time intervals, for instance intermittently (e.g., when the content consumption device 1506(D) has a network connection with the media content platform 1514 via the network(s) 1504), and/or at regular intervals (e.g., daily, weekly, monthly, etc.). In examples, access rights to the digital media content items may be provided when a subscription to the media content platform 1514 is active, while access rights to the digital media content items may be withheld when the subscription to the media content platform 1514 is terminated. Enabling storage on the end user devices 1506 and subsequent access to digital media content items via the listener application 1528 provides the users 1516 with the ability to access the digital media content items “offline” such as when a connection to the media content platform 1514 via the network(s) 1504 is unavailable or unreliable.

In some examples, the media content platform 1514 may additionally or alternatively provide an artist management service that enables the users 1516 to manage aspects of artist business via an artist application 1530 installed on the artist device 1506(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1516 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1516 may have access to a single user account via respective end user devices 1506, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1530 and the listener application 1528 may be distinct applications having differing user experiences and verification processes for access, such as illustrated in the environment 1500. For instance, the media content platform 1514 may request additional verification, such as a link to an artist website, a sample of an artist’s work, a verified credential supplied by a third party, etc. to grant access to the artist application 1530 in addition to information requested to access the listener application 1528. Further, the artist application 1530 may provide the artist management services described herein, without the subscription-based digital media streaming services described herein, and vice versa. However, examples are also considered in which functionality provided by the artist application 1530 and the listener application 1528 partially or fully overlap, and/or where verification processes for access are substantially similar.

In at least some examples, the media content platform 1514 enables interaction between the users 1516 utilizing the listener application 1528 installed on the content consumption devices 1506(D), and the users 1516 utilizing the artist application 1530 installed on the artist devices 1506(E). For example, the media content platform 1514 may provide interconnectivity between the subscription-based digital media streaming service and the artist management service. Functionality provided by the media content platform 1514 in such instances may include a communication channel between one or more of the users 1516 (e.g., a listener, fan, music supervisor, publisher, etc.) utilizing the listener application 1528 and another user (e.g., an artist) of the users 1516 utilizing the artist application 1530. The communication channel may include, for instance, a messaging platform (also referred to as a "messaging application" herein), a live streaming platform, a videoconferencing or teleconferencing platform, and/or a combination of these.

Additionally, in some cases, the media content platform 1514 may facilitate a resource transfer between the listener application 1528 and the artist application 1530. In an example, the media content platform 1514 may direct a resource, such as a portion of a subscription fee paid by one of the users 1516 designated as a listener, to one or more of the users 1516 designated as artists based on a number of instances that the listening user consumed (e.g., streamed, downloaded, etc.) content created by respective ones of the artist users. Alternatively or additionally, the media content platform 1514 may direct a resource, such as funds, from an account associated with a listening user to an account associated with an artist user (or vice versa), in accordance with transfers between accounts as described herein. The media content platform 1514 may facilitate resource transfers in examples such as merchandise purchases, event ticket purchases, "tipping" an artist, payments for royalties or other fees, and so forth.

In some examples, the media content platform 1514 enables interaction between individual ones of the users 1516 with one another via the listener application 1528 installed on the content consumption device 1506(D) and other of the content consumption devices 1506(D) via a communication channel as described above. In an example, the listener application 1528 may provide functionality via a communication channel for a user to stream an individual digital media item, a playlist, or the like to an audience comprising other ones of the content consumption devices 1506(D). Alternatively or additionally, the communication channel may facilitate sharing of individual digital media items, playlists, user and/or artist profiles, and the like between the users 1516 via messages, uniform resource locators (URLs), quick response (QR) codes, and so forth.

In some cases, the media content platform 1514 enables interaction between individual ones of the users 1516 with one another via the artist application 1530 installed on the artist device 1506(E) and other of the artist devices 1506 via a communication channel as described above. In some instances, the media content platform 1514 may provide recommendations for a particular user indicating which of the other users 1516 to communicate with. Such a recommendation may be based on a similarity (or dissimilarity) of content created by two or more of the users 1516, an overlap (or lack thereof) of audience members of the users 1516, a geographic location of the users 1516, a coinciding event location of the users 1516, and so forth. In some examples, a user may input parameters for a desired connection via the artist application 1530, and the media content platform 1514 may filter which of the users 1516 to surface for recommendations to the user based on the input parameters. Alternatively or additionally, the media content platform 1514 may implement one or more machine learning models to filter which of the users 1516 to surface for recommendations to the user. The recommendations provided by the media content platform 1514 may be data driven and thus increase relevance of communications presented to the users 1516 and reduce unsolicited communications that may be received by the users 1516.

The media content platform 1514 may interact with the server(s) 1508 associated with the third-party service providers to, for instance, ingest digital media items, report digital media consumption data, pay royalties, and the like. In some examples, the server(s) 1508 may be accessible by the media content platform 1514 via one or more APIs 1518 or other integrations. In some cases, the third-party service provider may be a digital media content provider (e.g., a record label, a performance rights organization (PRO), an independent artist, etc.). In such cases, the media content platform 1514 may receive digital media content items from the server(s) 1508, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 1514 may use the metadata to associate the digital media content item as being created by a particular user, to provide search results to the users 1516, to generate playlists, and so forth. Further, the media content platform 1514 may provide payments (e.g., royalties) to the third-party service provider based on a number of streams and/or downloads of individual digital media content items by the users via the listener application 1528.

Techniques described herein are directed to services provided via a distributed system of end user devices 1506 that are in communication with server(s) 1502 of the service provider. That is, techniques described herein are directed to a specific implementation—or, a practical application—of utilizing a distributed system of end user devices 1506 that are in communication with server(s) 1502 of the seller platform 1510, the P2P platform 1512, and/or the media content platform 1514 to perform a variety of services, as described above. The unconventional configuration of the distributed system described herein enables the server(s) 1502 that are remotely-located from end-users (e.g., users 1516) to intelligently offer services based on aggregated data associated with the end-users, such as the users 1516 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the seller platform 1510, the P2P platform 1512, and/or the media content platform 1514, and those outside of the control of these service providers, to track the standing (payables, receivables, payroll, invoices, appointments, capital, balances, collaborations, etc.) of the users 1516. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1516 and end user devices 1506. Furthermore, such features are changed dynamically based on the profiles of the users involved interacting with the GUIs. As such, techniques described herein are directed to improvements to computing systems.

The seller platform 1510, the P2P platform 1512, and/or the media content platform 1514 are capable of providing additional or alternative services, and the services described above are offered as a sampling of services. In at least one example, the seller platform 1510, the P2P platform 1512, and/or the media content platform 1514 can exchange data with the server(s) 1508 associated with third-party service providers. Such third-party service providers can provide information that enables the seller platform 1510, the P2P platform 1512, and/or the media content platform 1514 to provide services, such as those described above. In additional or alternative examples, such third-party service providers can access services of the seller platform 1510, the P2P platform 1512, and/or the media content platform 1514. That is, in some examples, the third-party service providers can be subscribers, or otherwise access, services of the seller platform 1510, the P2P platform 1512, and/or the media content platform 1514.

FIG. 16 illustrates an example environment 1600 including a service provider system 1602 which may be associated with the server(s) 1502 of FIG. 15. The environment 1600 may also include a user device 1604, which may correspond to any of the end user devices 1506 described in relation to FIG. 15. In examples, the service provider system 1602 may include one or a combination of the seller platform 1510, the P2P platform 1512, or the media content platform 1514, as well as one or more data store(s) 1606 that can store assets in an asset storage 1608, as well as data in user account(s) 1610. In some examples, the environment 1600 may also include a public blockchain 1614, one or more nodes 1616, and/or a hardware wallet 1618. The service provider system 1602, the user device 1604, public blockchain 1614, the node(s) 1616, and the hardware wallet 1618 may be connected and able to communicate via one or more networks 1620, which may have the same or similar functionality described in relation to the network 1504 of FIG. 15.

In some examples, user account(s) 1610 can include merchant account(s), customer account(s), media content subscriber account(s), artist account(s), and so forth. In at least one example, the asset storage 1608 can be used to record whether individual assets are registered to a user account 1610. For example, the asset storage 1608 can include asset wallet(s) 1622 for storing records of assets owned by the service provider system 1602, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1508 of FIG. 15 can be associated therewith.

The asset wallet 1622 can be associated with one or more addresses and can vary addresses used to acquire assets (e.g., from the asset network(s)) so that its holdings are represented under a variety of addresses on the asset network. In examples where the service provider system 1602 has holdings of cryptocurrency (e.g., in the asset wallet 1622), a user can acquire cryptocurrency directly from the service provider system 1602. In some examples, the service provider system 1602 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1602 can provide the same or similar functionality for securities or other assets.

The asset storage 1608 may contain ledgers that store records of assignments of assets to users 1516. Specifically, the asset storage 1608 may include asset ledger 1624, fiat currency ledger 1626, and/or other ledger(s) 1628, which can be used to record transfers of assets between users 1516 and/or one or more third-parties (e.g., merchant network(s), payment card network(s), ACH network(s), equities network(s), the asset network, securities networks, etc.). In doing so, the asset storage 1608 can maintain a running balance of assets managed by the service provider system 1602. The ledger(s) of the asset storage 1608 can further indicate some of the running balance for individual ledger(s) stored in the asset storage 1608 are assigned or registered to one or more user account(s) 1610.

In at least one example, the asset storage 1608 can include transaction logs 1630, which can include, as transaction data, records of past transactions involving the service provider system 1602 and/or the user account 1610. In some examples, the data store(s) 1606 can store a private blockchain 1632. A private blockchain 1632 can function to record sender addresses, recipient addresses, public keys, values of cryptocurrency transferred, and/or can be used to verify ownership of cryptocurrency tokens to be transferred. In some examples, the service provider system 1602 can record transactions involving cryptocurrency until the number of transactions has exceeded a determined limit (e.g., number of transactions, storage space allocation, etc.). Based at least in part on determining that the limit has been reached, the service provider system 1602 can publish the transactions in the private blockchain 1632 to the public blockchain 1614 (e.g., associated with the asset network), where miners can verify the transactions and record the transactions to blocks on the public blockchain 1614. In at least one example, the service provider system 1602 can participate as miner(s) at least for transactions to which the respective platform is a party to, to be posted to the public blockchain 1614.

In some cases, the data store(s) 1606 can store and/or manage multiple user accounts, an example of which is described in relation to the user account 1610. In at least one example, the user account 1610 can include user account data 1634, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1634 can include account activity 1636 and user wallet key(s) 1638. In some examples, the user wallet key(s) 1638 can include a public-private key-pair and a respective address associated with the asset network or other asset networks. In some examples, the user wallet key(s) 1638 may include one or more key pairs, which can be unique to the asset network or other asset networks.

In addition to the user account data 1634, the user account 1610 can include ledger(s) for account(s) managed by the service provider system 1602, for the user. For example, the user account 1610 may include an asset ledger 1624, a fiat currency ledger 1626, and/or one or more other ledgers 1628. The ledger(s) can indicate that a corresponding user utilizes the service provider system 1602 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1602.

In some examples, the asset ledger 1624 can store a balance for each of one or more cryptocurrencies (e.g., Bitcoin, Ethereum, Litecoin, etc.) registered to the user account 1610. In at least one example, the asset ledger 1624 can further record transactions of cryptocurrency assets associated with the user account 1610. For example, the user account 1610 can receive cryptocurrency from the asset network using the user wallet key(s) 1638. In some examples, the user wallet key(s) 1638 may be generated for the user upon request. User wallet key(s) 1638 can be requested by the user in order to send, exchange, or otherwise control the balance of cryptocurrency held by the service provider system 1602 (e.g., in the asset wallet 1622) and registered to the user. In some examples, the user wallet key(s) 1638 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1602 and the value is credited as a balance in asset ledger 1624), by purchasing currency in the form associated with the account using currency in a different form (e.g., buying a value of cryptocurrency from the service provider system 1602 using a value of fiat currency reflected in fiat currency ledger 1626, and crediting the value of cryptocurrency in asset ledger 1624), or by conducting a transaction with another user (customer or merchant) of the service provider system 1602 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1602 (i.e., an external account). Such a transaction can request that the user to transfer an amount of the cryptocurrency in a message signed by user's private key to an address provided by the service provider system 1602. In at least one example, the transaction can be sent to miners to bundle the transaction into a block of transactions and to verify the authenticity of the transactions in the block. Once a miner has verified the block, the block is written to the public blockchain 1614 where the service provider system 1602 can then verify that the transaction has been confirmed and can credit the user's asset ledger 1624 with the transferred amount. When an account is funded by transferring cryptocurrency from a third-party cryptocurrency wallet, an update can be made to the public blockchain 1614. In some cases, this update of the public blockchain 1614 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1602. As described above, in some examples, the service provider system 1602 can acquire cryptocurrency from a third-party source. In examples where the service provider system 1602 has its own cryptocurrency assets, cryptocurrency transferred in a transaction (e.g., data with address provided for receipt of transaction and a balance of cryptocurrency transferred in the transaction) can be stored in an asset wallet 1622 associated with the service provider system 1602. In at least one example, the service provider system 1602 can credit the asset ledger 1624 of the user. Additionally, while the service provider system 1602 recognizes that the user retains the value of the transferred cryptocurrency through crediting the asset ledger 1624, an inspection of the blockchain will show the cryptocurrency as having been transferred to the service provider system 1602. In some examples, the asset wallet 1622 can be associated with many different addresses. In such examples, an inspection of the blockchain may not necessarily associate all cryptocurrency stored in asset wallet 1622 as belonging to the same entity. The presence of a private ledger used for real-time transactions and maintained by the service provider system 1602, combined with updates to the public ledger at other times, allows for extremely fast transactions using cryptocurrency to be achieved. In some examples, the "private ledger" can refer to the asset ledger 1624, which in some examples, can utilize the private blockchain 1632, as described herein. The "public ledger" can correspond to the public blockchain 1614 associated with the asset network.

In at least one example, an asset ledger 1624, fiat currency ledger 1626, or the like associated with the user account 1610 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1624. In some examples, a user can receive fiat currency or another currency in the form of payment for a transaction with another user. In at least one example, at least a portion of such funds can be converted into cryptocurrency by the service provider system 1602 and used to fund the asset ledger 1624 of the user.

In examples, a user can also have an account in U.S. dollars, which can be tracked, for example, via the fiat currency ledger 1626. Such an account can be funded by transferring money from a bank account at a third-party bank to an account maintained by the service provider system 1602 as is conventionally known. In some examples, a user can receive fiat currency in the form of payment for a transaction with another user. In such examples, at least a portion of such funds can be used to fund the fiat currency ledger 1626.

In some examples, a user can have one or more internal payment cards registered with the service provider system 1602. Internal payment cards can be linked to one or more of the accounts associated with the user account 1610. In some embodiments, options with respect to internal payment cards can be adjusted and managed using an application (e.g., the payment application 1526, a wallet application 1612, etc.).

In at least one example, the user account 1610 can be associated with the asset wallet accessible via a wallet application 1612 of the user device 1604, or a stored balance for use in payment transactions, peer-to-peer transactions, payroll payments, etc. In at least one example, the asset wallet 1622 can store data indicating an address provided for receipt of a cryptocurrency transaction. In at least one example, the balance of the asset wallet 1622 can be based at least in part on a balance of the asset ledger 1624. In at least one example, funds availed via the asset wallet 1622 can be stored in the asset wallet 1622. Funds availed via the asset wallet 1622 can be tracked via the asset ledger 1624. The asset wallet 1622, however, can be associated with additional cryptocurrency funds.

In at least one example, when the service provider system 1602 includes a private blockchain 1632 for recording and validating cryptocurrency transactions, the asset wallet 1622 can be used instead of, or in addition to, the asset ledger 1624. For example, a merchant can provide the address of the asset wallet 1622 for receiving payments. In an example where a customer is paying in cryptocurrency and the customer has their own cryptocurrency wallet account associated with the service provider system 1602, the customer can send a message signed by its private key including its wallet address (i.e., of the customer) and identifying the cryptocurrency and value to be transferred to the merchant's asset wallet 1622. The service provider system 1602 can complete the transaction by reducing the cryptocurrency balance in the customer's cryptocurrency wallet and increasing the cryptocurrency balance in the merchant's asset wallet 1622. In addition to recording the transaction in the respective cryptocurrency wallets, the transaction can be recorded in the private blockchain 1632 and the transaction can be confirmed. A user can perform a similar transaction with cryptocurrency in a peer-to-peer transaction as described above.

While the asset ledger 1624 and/or asset wallet 1622 are each described above with reference to cryptocurrency, the asset ledger 1624 and/or asset wallet 1622 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1602 is an aspect of the technology disclosed that enables technical advantages of increased processing speed and improved security.

The description of the environment 1600 above generally relates to a centralized service provider that at least partially facilitates storing and managing assets in the data store 1606. However, the environment 1600 may also facilitate decentralized storage and management of assets alternatively or in addition to centralized storage and management as described above. For instance, the environment 1600 may include a decentralized platform implemented using a plurality of nodes (e.g., web nodes), an example of which is illustrated as node 1616. The node 1616 is representative of a computer or other device tasked with validating transactions and/or maintaining a copy of a blockchain ledger, such as a ledger associated with the public blockchain 1614. The decentralized platform may be implemented via the environment 1600 through use of decentralized identifiers and verifiable credentials that are stored and managed by user devices 1604. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1602). The decentralized identity referenced by a decentralized identifier gives an entity control over what data can be accessed, stored, modified, and so forth by other entities, such as the service provider system 1602.

The node 1616, as representative of one of a plurality of decentralized nodes (e.g., decentralized web nodes), supports data storage and relays that allows entities, service provider systems, individuals, organizations and so forth to send, store, and receive encrypted or public messages and data. The node 1616 is universally addressable and is "crawlable" using data addressing in relation to the decentralized identifiers. The node 1616 is also configured to support decentralized replication of data across the nodes that is consistent across multiple nodes over time through continued data communication between the nodes in the decentralized platform. The node 1616 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1604 may be an issuer, a holder, and/or a verifier, as can the service provider system 1602.

In some examples, the user device 1604 may implement a wallet application 1612 configured to manage decentralized identifiers and/or verifiable credentials. For instance, the wallet application 1612 may provide a user interface for implementation of access controls to various data associated with the decentralized identifier by the service provider system 1602, to other user devices, and so forth. Additionally, the wallet application 1612 may be configured to provide functionality for resource transfers (e.g., cryptocurrency, fiat currency, etc.) with the service provider system 1602, other user devices, and the like, based on techniques described herein.

In some examples, the hardware wallet 1618 may store cryptocurrency assets in combination with the wallet application 1612 and the service provider system 1602. For instance, the hardware wallet 1618, the wallet application 1612, and the service provider system 1602 may each store a respective, different private key, where a transaction with the cryptocurrency assets is signed by at least two of the three private keys. The user interface provided by the wallet application 1612 may allow a user to request a transaction. The wallet application 1612 may then sign the transaction with the private key of the wallet application 1612, have either the hardware wallet 1618 or the service provider system 1602 use a second of the three private keys to sign the transaction, and then provide the transaction with two signatures to the public blockchain 1614 for processing.

Figure 17:
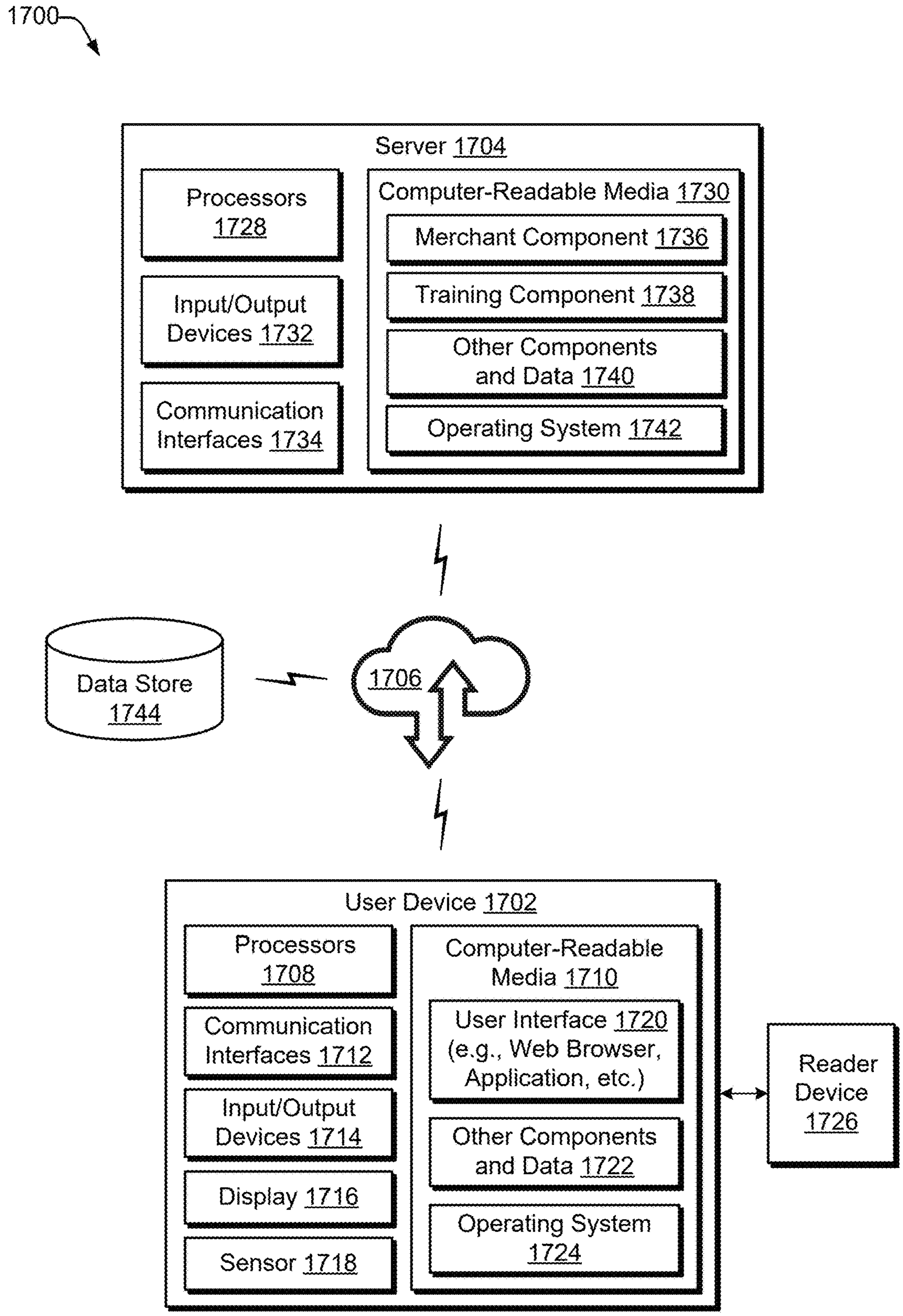
FIG. 17 is a non-limiting example illustrating an environment in which recommendation techniques described herein are performed in accordance with one or more implementations.

FIG. 17 depicts an illustrative block diagram illustrating a system 1700 for performing techniques described herein. The system 1700 includes a user device 1702, that communicates with server computing device(s) (e.g., server(s) 1704) via network(s) 1706 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1702 is illustrated, in additional or alternate examples, the system 1700 can have multiple user devices (e.g., client device 106, consumer client device 410), as described above with reference to FIG. 15.

In at least one example, the user device 1702 can be any suitable type of computing device, e.g., portable, semi-portable, semi-stationary, or stationary. Some examples of the user device 1702 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1702 can be any computing device capable of sending communications and performing the functions according to the techniques described herein. The user device 1702 can include devices, e.g., payment card readers, or components capable of accepting payments, as described below. The user device 1702 may be representative of, and provide functionality for, the user devices 1506 described in relation to FIG. 15.

In the illustrated example, the user device 1702 includes one or more processors 1708, one or more computer-readable media 1710, one or more communication interface(s) 1712, one or more input/output (I/O) devices 1714, a display 1716, and sensor(s) 1718. The user device 1702 is also configurable to include one or more encoders and one or more decoders.

In at least one example, each processor 1708 can itself comprise one or more processors or processing cores. For example, the processor(s) 1708 can be implemented as one or more microprocessors, microcomputers, microcontrollers, digital signal processors, central processing units, state machines, logic circuitries, and/or any devices that manipulate signals based on operational instructions. In some examples, the processor(s) 1708 can be one or more hardware processors and/or logic circuits of any suitable type specifically programmed or configured to execute the algorithms and processes described herein. The processor(s) 1708 can be configured to fetch and execute computer-readable processor-executable instructions stored in the computer-readable media 1710.

Depending on the configuration of the user device 1702, the computer-readable media 1710 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1710 can include, but is not limited to, RAM, ROM, EEPROM, flash memory, solid-state storage, magnetic disk storage, optical storage, and/or other computer-readable media technology. Further, in some examples, the user device 1702 can access external storage, such as RAID storage systems, storage arrays, network attached storage, storage area networks, cloud storage, or any other medium that can be used to store information and that can be accessed by the processor(s) 1708 directly or through another computing device or network. Accordingly, the computer-readable media 1710 can be computer storage media able to store instructions, components or components that can be executed by the processor(s) 1708. Further, when mentioned, non-transitory computer-readable media exclude media such as energy, carrier signals, electromagnetic waves, and signals per se.

The computer-readable media 1710 can be used to store and maintain any number of functional components that are executable by the processor(s) 1708. In some implementations, these functional components comprise instructions or programs that are executable by the processor(s) 1708 and that, when executed, implement operational logic for performing the actions and services attributed above to the user device 1702. Functional components stored in the computer-readable media 1710 can include a user interface 1720 to enable users to interact with the user device 1702, and thus the server(s) 1704 and/or other networked devices. In at least one example, a user can interact with the user interface via touch input, spoken input, gesture, or any other type of input. The word "input" is also used to describe "contextual" input that may not be directly provided by the user via the user interface 1720. Examples of user interfaces include user interface 212, user interface 1106, and so on. For example, user's interactions with the user interface 1720 are analyzed using, e.g., natural language processing techniques, user movement tracking techniques, eye tracking techniques, etc. to determine context or intent of the user, which may be treated in a manner similar to "direct" user input.

Depending on the type of the user device 1702, the computer-readable media 1710 can also optionally include other functional components and data, such as other components and data 1722, which can include programs, drivers, etc., and the data used or generated by the functional components. In addition, the computer-readable media 1710 can also store data, data structures and the like, that are used by the functional components. Further, the user device 1702 can include many other logical, programmatic and physical components, of which those described are merely examples that are related to the discussion herein.

In at least one example, the computer-readable media 1710 can include additional functional components, such as an operating system 1724 for controlling and managing various functions of the user device 1702 and for enabling user interactions.

The communication interface(s) 1712 can include one or more interfaces and hardware components for enabling communication with various other devices, such as over the network(s) 1706 or directly. For example, communication interface(s) 1712 can enable communication through one or more network(s) 1706, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1706 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1702 can further include one or more input/output (I/O) devices 1714. The I/O devices 1714 can include speakers, a microphone, a camera, and various user controls (e.g., buttons, a joystick, a keyboard, a keypad, etc.), a haptic output device, and so forth. The I/O devices 1714 can also include attachments that leverage the accessories (audio-jack, USB-C, Bluetooth, etc.) to connect with the user device 1702.

In at least one example, user device 1702 can include a display 1716. Depending on the type of computing device(s) used as the user device 1702, the display 1716 can employ any suitable display technology. For example, the display 1716 can be a liquid crystal display, a plasma display, a light emitting diode display, an OLED (organic light-emitting diode) display, an electronic paper display, or any other suitable type of display able to present digital content thereon. In at least one example, the display 1716 can be an augmented reality display, a virtual reality display, or any other display able to present and/or project digital content. In some examples, the display 1716 can have a touch sensor associated with the display 1716 to provide a touchscreen display configured to receive touch inputs for enabling interaction with a graphic interface presented on the display 1716. Accordingly, implementations herein are not limited to any particular display technology. In some examples, the user device 1702 may not include the display 1716, and information can be presented by other means, such as aurally, haptically, etc.

In addition, the user device 1702 can include sensor(s) 1718. The sensor(s) 1718 can include a global positioning system ("GPS") device able to indicate location information. Further, the sensor(s) 1718 can include, but are not limited to, an accelerometer, gyroscope, compass, proximity sensor, camera, microphone, and/or a switch.

In some examples, the GPS device can be used to identify a location of a user. In at least one example, the location of the user can be used by the seller platform 1510, the P2P platform 1512, and/or the media content platform 1514, described above, to provide one or more services. That is, in some examples, the service provider can implement geofencing to provide particular services to users by the seller platform 1510, the P2P platform 1512, and/or the media content platform 1514.

In examples, the user device 1702 includes a codec system, which may comprise an encoder and/or a decoder. The encoder is configured to encode a data stream or signal from an analog signal (e.g., an analog audio signal, an analog video signal, etc.) to a digital signal for transmission or storage. The decoder is configured to convert the digital signal back to an analog signal, such as for playback or editing. In some cases, the encoder may be configured to encode the data stream or analog signal in an encrypted format, and the decoder may accordingly be configured to decrypt the digital signal as part of the decoding process (e.g., using a cryptographic key). Additionally, in some examples, the encoder may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder and/or the decoder may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1700, the server 1704 may include an encoder and/or a decoder as well.

Additionally, the user device 1702 can include various other components that are not shown, examples of which include removable storage, a power source, such as a battery and power control unit, a barcode scanner, a printer, a cash drawer, and so forth.

In addition, as described in relation to FIG. 15, the user device 1702 can include, be connectable to, or otherwise be coupled to a reader device 1726, for reading payment instruments and/or identifiers associated with payment objects. The reader device 1726 can include a read head for reading a magnetic strip of a payment card, and further can include encryption technology for encrypting the information read from the magnetic strip. Additionally or alternatively, the reader device 1726 can be an EMV payment reader, which in some examples, can be embedded in the user device 1702. Moreover, numerous other types of readers can be employed with the user device 1702 herein, depending on the type and configuration of the user device 1702.

The reader device 1726 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1726 may include hardware implementation, such as slots, magnetic tracks, and rails with one or more sensors or electrical contacts to facilitate detection and acceptance of a payment instrument. That is, the reader device 1726 may include hardware implementations to enable the reader device 1726 to interact with a payment instrument via a swipe, a dip, or a tap to obtain payment data associated with a customer. Additionally or optionally, the reader device 1726 may also include a biometric sensor to receive and process biometric characteristics and process them as payment instruments, given that such biometric characteristics are registered with the payment service and connected to a financial account with a bank server. The reader device 1726 may include processing unit(s), computer-readable media, a reader chip, a transaction chip, a timer, a clock, a network interface, a power supply, and so on. That is, the reader device 1726 may include any of the computing components described herein with reference to the user device 1702 to implement the functionality provided by the reader device 1726.

In examples, the reader device 1726 includes a reader chip, which may perform functionality to control the power supply, among other functionality of the reader device 1726. The power supply may include one or more power supplies such as a physical connection to AC power or a battery. Power supply may include power conversion circuitry for converting AC power and generating a plurality of DC voltages for use by components of reader device 1726. When power supply includes a battery, the battery may be charged via a physical power connection, via inductive charging, or via any other suitable method.

The reader device 1726 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1702, which can be a POS terminal, and the reader device 1726 are shown as separate devices, in additional or alternative examples, the user device 1702 and the reader device 1726 can be part of a single device, which may be a battery-operated device. In some examples, the reader device 1726 can have a display integrated therewith, which can be in addition to (or as an alternative of) the display 1716 associated with the user device 1702.

The server(s) 1704 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1704 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1704 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1704 can include one or more processors 1728, one or more computer-readable media 1730, one or more I/O devices 1732, and one or more communication interfaces 1734. Each processor 1728 can be a single processing unit or a number of processing units and can include single or multiple computing units or multiple processing cores. The processor(s) 1728 can be implemented as one or more microprocessors, microcomputers, microcontrollers, digital signal processors, central processing units, state machines, logic circuitries, and/or any devices that manipulate signals based on operational instructions. For example, the processor(s) 1728 can be one or more hardware processors and/or logic circuits of any suitable type specifically programmed or configured to execute the algorithms and processes described herein. The processor(s) 1728 can be configured to fetch and execute computer-readable instructions stored in the computer-readable media 1730, which can program the processor(s) 1728 to perform the functions described herein.

The computer-readable media 1730 can include volatile and nonvolatile memory and/or removable and non-removable media implemented in any type of technology for storage of information, such as computer-readable instructions, data structures, program components, or other data. Such computer-readable media 1730 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1704, the computer-readable media 1730 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1730 can be used to store any number of functional components that are executable by the processor(s) 1728. In many implementations, these functional components comprise instructions or programs that are executable by the processors 1728 and that, when executed, specifically configure the one or more processors 1728 to perform the actions attributed above to the seller platform 1510, the P2P platform 1512, and/or the media content platform 1514. Functional components stored in the computer-readable media 1730 can optionally include a merchant component 1736, a training component 1738, and one or more other components and data 1740. The computer-readable media 1730 can additionally include an operating system 1742 for controlling and managing various functions of the server(s) 1704.

The merchant component 1736 can be configured to receive transaction data from POS systems, such as the POS system 1524 described above with reference to FIG. 15. The merchant component 1736 can transmit requests (e.g., authorization, capture, settlement, etc.) to payment service server computing device(s) to facilitate POS transactions between merchants and customers. The merchant component 1736 can communicate the successes or failures of the POS transactions to the POS systems.

The training component 1738 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1702 and/or the server(s) 1704 for use at a time after the data models have been trained (e.g., at runtime).

The one or more other components and data 1740 can include functionality of which is described above. Further, the one or more other components and data 1740 can include programs, drivers, etc., and the data used or generated by the functional components. Further, the server(s) 1704 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1734 can include one or more interfaces and hardware components for enabling communication with various other devices, such as over the network(s) 1706 or directly. For example, communication interface(s) 1734 can enable communication through one or more network(s) 1706, which can include, but are not limited any type of network known in the art, as described herein.

The server(s) 1704 can further be equipped with various I/O devices 1732. Such I/O devices 1732 can include a display, various user interface controls (e.g., buttons, joystick, keyboard, mouse, touch screen, biometric or sensory input devices, etc.), audio speakers, connection ports and so forth.

In at least one example, the system 1700 can include a datastore 1744 that can be configured to store data that is accessible, manageable, and updatable. In some examples, the datastore 1744 can be integrated with the user device 1702 and/or the server(s) 1704. In other examples, as shown in FIG. 17, the datastore 1744 can be located remotely from the server(s) 1704 and can be accessible to the server(s) 1704. The datastore 1744 can comprise multiple databases and/or servers connected locally and/or remotely via the network(s) 1706. In at least one example, the datastore 1744 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1744 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1744 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:

generating, by a decentralized platform, a network of decentralized nodes individually configured to store, receive, and transmit data;

receiving, by a client device, a software development kit that is executable to output a user interface configured to specify digital content to be included in a personal datastore and access control data to specify verifiable credentials to control access to the digital content;

associating, by the decentralized platform, a decentralized identifier of an artist associated with the digital content with a selected decentralized node of the decentralized nodes through execution of the software development kit;

associating, by the decentralized platform, the personal datastore at the selected decentralized node such that the personal datastore is locatable using the decentralized identifier through execution of the software development kit;

presenting, by the client device, the user interface at the client device through execution of the software development kit, the user interface including options to upload personal datastore data to the personal datastore, the personal datastore data including the digital content of the artist and the access control data specifying the verifiable credentials;

uploading, by the client device via an upload application programming interface (API) of a personal datastore interface, the personal datastore data including an API identifier that specifies an API of a plurality of APIs via which the digital content is to be made available;

storing, by the decentralized platform, the digital content of the artist in the personal datastore at the selected decentralized node;

configuring, by the decentralized platform, entity access control logic at the selected decentralized node to:

associate the digital content with the API of the plurality of APIs specified by the API identifier, the API having rules implemented as part of the entity access control logic; and verify a cryptographic proof included in a presented verifiable credential in accordance with the rules associated with the specified API prior to permitting access to the digital content; and exposing, by the decentralized platform, the digital content for access through the specified API based on the verifiable credentials via the personal datastore using the entity access control logic, the personal datastore located using the decentralized identifier.

2. The method as described in claim 1, wherein the software development kit is configured to implement generative artificial intelligence (AI) through use of a machine-learning model to configure the entity access control logic based on the access control data received via the user interface.

3. The method as described in claim 1, wherein the user interface presented through execution of the software development kit is configured to output options that are user selectable to indicate application programming interfaces that are usable to access the digital content from the personal datastore.

4. The method as described in claim 1, wherein the software development kit is configured to incorporate a payment verification module at the personal datastore, the payment verification module configured to initiate fee collection for access to the digital content.

5. The method as described in claim 4, wherein the payment verification module is configured to access a payment platform via a network to initiate the fee collection.

6. The method as described in claim 1, wherein the configuring includes configuring the entity access control logic based on inputs received from a digital content publishing system associated with the digital content.

7. The method as described in claim 6, wherein the configuring includes issuing the verifiable credentials by the digital content publishing system.

8. The method as described in claim 6, wherein the configuring includes specifying control of access of:

a first item of digital content available via the personal datastore by the digital content publishing system; and a second item of digital content available via the personal datastore by the artist.

9. The method as described in claim 8, wherein the first item of digital content is associated with access controls that are configured to cause, upon detecting occurrence of an event:

transfer of the first item of digital content from the personal datastore to a second personal datastore associated with the digital content publishing system; and deletion of the first item of digital content from the personal datastore following completion of the transfer.

10. The method as described in claim 8, wherein access to the first item of digital content by the personal datastore is controlled by one or more verifiable credentials associated with the digital content publishing system.

11. The method as described in claim 1, wherein each of the verifiable credentials includes a cryptographic proof that is usable to verify authenticity of the verifiable credential.

12. A system comprising:

a client device coupled via a computer network to a service provider system comprising one or more processors; and memory coupled to the one or more processors, with instructions stored thereon that, when executed by the one or more processors, cause the one or more processors to perform operations comprising:

generating, by the service provider system, a network of decentralized nodes individually configured to store, receive, and transmit data;

transmitting, by the service provider system and to the client device, software development kit that is executable at the client device to output a user interface configured to specify digital content to be included in a personal datastore and access control data to specify verifiable credentials to control access to the digital content;

associating a decentralized identifier of an artist associated with the digital content with a selected decentralized node of the decentralized nodes through execution of the software development kit;

associating the personal datastore at the selected decentralized node such that the personal datastore is locatable using the decentralized identifier through execution of the software development kit;

storing the digital content in the personal datastore at the selected decentralized node;

configuring entity access control logic at the selected decentralized node to associate the digital content with an application programming interface (API) specified by an API identifier, the API having rules implemented as part of the entity access control logic and verify a cryptographic proof included in a presented verifiable credential in accordance with the rules associated with the specified API prior to permitting access; and exposing the digital content for access through the specified API based on the verifiable credentials via the personal datastore using the entity access control logic, the personal datastore located using the decentralized identifier;

wherein the client device is configured to perform operations comprising:

presenting the user interface at the client device through execution of the software development kit at the client device, the user interface including options to upload personal datastore data to the personal datastore, the personal datastore data including the digital content of the artist and the access control data specifying the verifiable credentials; and uploading, via an upload API of a personal datastore interface, the personal datastore data including the API identifier that specifies a particular API via which the digital content is to be made available.

13. The system of claim 12, wherein the software development kit is configured to implement generative artificial intelligence (AI) through use of a machine-learning model to configure the entity access control logic based on the access control data received via the user interface.

14. The system of claim 12, wherein the user interface presented through execution of the software development kit is configured to output options that are user selectable to indicate application programming interfaces that are usable to access the digital content from the personal datastore.

15. The system of claim 12, wherein the software development kit is configured to incorporate a payment verification module at the personal datastore, the payment verification module configured to initiate fee collection for access to the digital content.

16. The system of claim 15, wherein the payment verification module is configured to access a payment platform via a network to initiate the fee collection.

* * * * *